United States Patent
Li et al.

(10) Patent No.: US 12,225,119 B2
(45) Date of Patent: Feb. 11, 2025

(54) INFORMATION SENDING METHOD, KEY GENERATION METHOD, AND APPARATUS

(71) Applicant: Huawei Technologies Co., Ltd., Shenzhen (CN)

(72) Inventors: He Li, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/011,698

(22) Filed: Sep. 3, 2020

(65) Prior Publication Data

US 2020/0403788 A1 Dec. 24, 2020

Related U.S. Application Data

(63) Continuation of application No. PCT/CN2019/080159, filed on Mar. 28, 2019.

(30) Foreign Application Priority Data

Apr. 8, 2018 (CN) .......................... 201810308232.1

(51) Int. Cl.
*H04L 9/08* (2006.01)
*H04L 9/32* (2006.01)

(52) U.S. Cl.
CPC .......... *H04L 9/0866* (2013.01); *H04L 9/0819* (2013.01); *H04L 9/088* (2013.01); *H04L 9/3242* (2013.01)

(58) Field of Classification Search
CPC ..... H04L 9/0866; H04L 9/0819; H04L 9/088; H04L 9/3242
See application file for complete search history.

(56) References Cited

U.S. PATENT DOCUMENTS 10,531,292 B2 *  1/2020  Ben Henda ......... H04W 36/385
10,728,757 B2 *  7/2020  Wu ................... H04W 36/0033
(Continued)

FOREIGN PATENT DOCUMENTS

CN          101505479 A         8/2009
CN          101835156 A    *    9/2010
(Continued)

OTHER PUBLICATIONS

Akshatha, N., et al., "A Centralized SDN Architecture for the 5G Cellular Network," 2018 IEEE 5G World Forum (5GWF), Nov. 1, 2018, 6 pages.

(Continued)

*Primary Examiner* — John B King
*Assistant Examiner* — Alex D Carrasquillo
(74) *Attorney, Agent, or Firm* — Conley Rose, P.C.

(57) ABSTRACT

An information sending method, a key generation method, and an apparatus, where a core network element first determines whether a terminal device needs to perform a key activation procedure, and then sends a first message to an access network element, where the first message indicates whether the access network element needs to send, to the terminal device, a second message to trigger the terminal device to perform the key activation procedure. After receiving the first message, the access network element determines, based on the first message, whether the second (Continued)

message needs to be sent to the terminal device, and sends the second message to the terminal device when the second message needs to be sent to the terminal device.

21 Claims, 12 Drawing Sheets

(56) References Cited

U.S. PATENT DOCUMENTS

| | | | | |
|---|---|---|---|---|
| 11,032,701 | B2* | 6/2021 | Yilmaz | H04W 74/08 |
| 11,770,467 | B2* | 9/2023 | Dai | G06F 21/64 |
| | | | | 370/329 |
| 2010/0115275 | A1* | 5/2010 | Suh | H04W 12/08 |
| | | | | 713/168 |
| 2011/0136473 | A1 | 6/2011 | Gupta et al. | |
| 2011/0161661 | A1 | 6/2011 | Medvinsky et al. | |
| 2013/0007434 | A1 | 1/2013 | King et al. | |
| 2018/0041926 | A1* | 2/2018 | Zhang | H04W 36/22 |
| 2018/0083972 | A1* | 3/2018 | Kim | H04L 41/0853 |
| 2019/0082325 | A1* | 3/2019 | Muhanna | H04W 12/04 |
| 2019/0253888 | A1* | 8/2019 | Jerichow | H04L 9/0844 |
| 2019/0281029 | A1* | 9/2019 | Zhang | H04W 88/06 |
| 2020/0120501 | A1* | 4/2020 | Ben Henda | H04L 63/062 |
| 2022/0116843 | A1* | 4/2022 | Velev | H04W 68/005 |

FOREIGN PATENT DOCUMENTS

| | | | | |
|---|---|---|---|---|
| CN | 102843651 | A | | 12/2012 |
| CN | 102932784 | A | | 2/2013 |
| CN | 103813308 | A | | 5/2014 |
| CN | 105532026 | A | | 4/2016 |
| CN | 107005927 | A | | 8/2017 |
| CN | 107276971 | A | | 10/2017 |
| EP | 3582531 | A1 | * 12/2019 | .......... H04W 12/041 |
| JP | 2011530839 | A | | 12/2011 |
| WO | 0042491 | A1 | | 7/2000 |
| WO | 2010052920 | A1 | | 5/2010 |
| WO | 2013183971 | A1 | | 12/2013 |

OTHER PUBLICATIONS

Rapporteur (Nokia), "Security Update," 3GPP TSG-RAN WG2 Meeting #101bis, Sanya, China, Apr. 16-20, 2018, R2-1804909, 6 pages.

3GPP TS 38.410 V0.8.0, "3rd Generation Partnership Project; Technical Specification Group Radio Access Network; NG-RAN; NG general aspect and principles (Release 15)," Mar. 2018, 13 pages.

3GPP TS 23.501 V15.1.0, "3rd Generation Partnership Project; Technical Specification Group Services and System Aspects; System Architecture for the 5G System; Stage 2 (Release 15)," Mar. 2018, 201 pages.

3GPP TS 23.502 V15.1.0, "3rd Generation Partnership Project; Technical Specification Group Services and System Aspects; Procedures for the 5G System; Stage 2 (Release 15)," Mar. 2018, 285 pages.

3GPP TS 33.501 V15.0.0, "3rd Generation Partnership Project; Technical Specification Group Services and System Aspects; Security architecture and procedures for 5G system (Release 15)," Mar. 2018, 128 pages.

3GPP TS 38.413 V0.7.0, "3rd Generation Partnership Project; Technical Specification Group Radio Access Network; NG-RAN; NG Application Protocol (NGAP) (Release 15)," Mar. 2018, 121 pages.

Nokia, et al, "Clause 6.4.2.2 Multiple active NAS connections in the same PLMN," 3GPP TSG SA WG3 (Security) Meeting #90, S3-180400, Jan. 22-26, 2018, Gothenburg, Sweden, 2 pages.

Huawei, et al,"The value Unique NAS connection identifier," 3GPP TSG SA WG3 (Security) Meeting #90BIS, S3-180646, Feb. 26-Mar. 2, 2018, San Diego, US, 1 pages.

Huawei, et al, "The value Unique NAS connection identifier", 3GPP TSG SA WG3 (Security) Meeting #90BIS, 83-180881, Feb. 26-Mar. 2, 2018, San Diego, US, 1 pages.

Nokia, Motorola Mobility, Lenovo, Clean up of ENs in Clause 7.2.1 Authentication for Untrusted non-3GPP Access , 3GPP TSG SA WG3 (Security) Meeting #90Bis S3-180940, [online], Mar. 2, 2018, total 6 pages.

* cited by examiner

INFORMATION SENDING METHOD, KEY
GENERATION METHOD, AND APPARATUS

CROSS-REFERENCE TO RELATED
APPLICATIONS

This application is a continuation of International Patent Application No. PCT/CN2019/080159 filed on Mar. 28, 2019, which claims priority to Chinese Patent Application No. 201810308232.1 filed on Apr. 8, 2018. The disclosures of the aforementioned applications are hereby incorporated by reference in their entireties.

TECHNICAL FIELD

This application relates to the field of communications technologies, and in particular, to an information sending method, a key generation method, and an apparatus.

BACKGROUND

Development of mobile services imposes an increasingly high requirement on security in wireless communication. Before a terminal device requests service data from a core network, the terminal device and the core network need to perform an activation procedure of a security protection function.

In a $4^{th}$ generation communications system (4G), the terminal device and the core network use a fixed procedure to activate the security protection function. The specific procedure is as follows. The terminal device first sends an initial non-access stratum (NAS) message to a mobility management entity (MME), to trigger the MME entity to perform authentication on the terminal device. After the authentication succeeds, the MME entity activates a NAS security protection function with the terminal device. After the MME entity activates the NAS security protection function with the terminal device, the MME entity activates an access stratum (AS) security protection function between a base station and the terminal device. After the MME entity activates AS security with the terminal device, the security protection functions between the core network, the terminal device, and the access network device are activated.

A $5^{th}$ generation communications system (5G) is constructed in a flexible manner to meet widely changing service requirements. For example, network capabilities may be flexibly and dynamically customized based on different application scenarios and different requirements. For example, some 5G systems are used to provide services with an ultra-low latency. In a 5G system of this type, if the complex activation procedure in the 4G system is still used, a relatively large latency is caused, and a requirement on the 5G system cannot be met. It can be learned that the activation procedure used for the security protection function in the 4G system cannot meet a flexibility requirement of the 5G system.

SUMMARY

Embodiments of this application provide an information sending method, a key generation method, and an apparatus, to resolve a technical problem that an activation procedure used for a security protection function cannot meet a flexibility requirement of a 5G system.

According to a first aspect, this application provides an information sending method. In the method, a core network element first determines whether a terminal device needs to perform a key activation procedure, and then sends a first message to an access network element, where the first message is used to indicate whether the access network element needs to send, to the terminal device, a second message used to trigger the terminal device to perform the key activation procedure. After receiving the first message, the access network element determines, based on the first message, whether the second message needs to be sent to the terminal device, and sends the second message to the terminal device if the second message needs to be sent to the terminal device.

In the foregoing technical solution, the core network element first determines whether the key activation procedure needs to be performed, and indicates a determining result to the access network element through the first message. After the access network element determines, based on content in the first message, that the key activation procedure needs to be triggered, the access network element sends the second message to the terminal device to trigger the key activation procedure. In this way, the access network element may selectively trigger the key activation procedure based on an actual situation. This can meet a flexibility requirement of a 5G system. Further, when the access network element determines that the key activation procedure does not need to be performed, the terminal device may not perform the key activation procedure. This can reduce signaling overheads.

In a possible design, the first message includes at least one of the following information: a key used to protect the second message, a root key KgNB used to generate the key, a key identifier used to indicate the key, indication information used to indicate whether the key activation procedure needs to be triggered, a type of the terminal device, and a latency required by a service needing to be performed by the terminal device.

In the foregoing technical solution, the core network element may indicate the determining result of the core network element to the access network element through one or more of the foregoing plurality of pieces of information. This can improve flexibility of the system.

In a possible design, after receiving a fourth message sent by the terminal device, the core network element determines whether the terminal device needs to perform the key activation procedure, where the fourth message is used by the terminal device to access a core network or used by the terminal device to request to establish a connection to the core network element for sending service data.

In the foregoing technical solution, the core network element determines whether the terminal device needs to perform the key activation procedure, only after the terminal device sends, to the core network element, an access request or a request for establishing the connection for sending the service data. In this way, the core network element may trigger, based on a requirement of the terminal device, a process of determining whether the terminal device needs to perform the key activation procedure. This can reduce power consumption of the core network element.

In a possible design, the core network element may determine, in one of the following plurality of determining manners, whether the terminal device needs to perform the key activation procedure. The plurality of determining manners are as follows.

In a first manner, if a type of the fourth message is a type indicating that user plane data needs to be established, the core network element determines that the key activation procedure needs to be performed, in a second manner, if determining, based on the fourth message, that the type of the terminal device is an Enhanced Mobile Broadband (eMBB) type, the core network element determines that the key activation procedure needs to be performed, and in a third manner, if determining, based on the fourth message, that the latency required by the service needing to be performed by the terminal device is greater than a preset latency, the core network element determines that the key activation procedure needs to be performed.

In the foregoing technical solution, the core network element may select one of the manners based on an actual situation, to determine whether the terminal device needs to perform the key activation procedure. This can improve flexibility of the core network element.

In a possible design, the core network element sends the first message to the access network element only after the core network element receives a third message that is sent by the access network element and that is used to request a parameter for triggering the key activation procedure.

In the foregoing technical solution, when the key activation procedure of the terminal device needs to be triggered, the access network element may actively request, from the core network element, the parameter used to trigger the key activation procedure, to trigger the core network element to send the first message to the access network element. In this way, using this solution, the access network element may send, to the terminal device at any time, a message that needs to be protected. This improves flexibility of the access network element.

In a possible design, the access network element determines, according to a preset policy and based on the first message, whether the second message needs to be sent to the terminal device.

In the foregoing technical solution, after receiving the first message, the access network element may further determine, with reference to the content in the first message and the preset policy, whether the second message needs to be sent to the terminal device. In this way, it can be avoided that the access network element directly triggers or does not trigger the key activation procedure based on the determining result of the core network element. This improves the flexibility of the access network element. Certainly, after the core network element indicates, to the access network element through the first message, the determining result of determining whether the key activation procedure needs to be triggered, the access network element may alternatively directly determine, based on the determining result, whether the second message needs to be sent to the terminal device. This can reduce operation complexity of the access network element and simplify the determining.

According to a second aspect, this application provides a key generation method. In the method, an access network element may generate a target key based on first input information that is obtained by a terminal device and that is used to generate the target key and second input information that is obtained by the access network element and that is used to generate the target key, where the target key is a key used to perform a key activation procedure.

In the foregoing technical solution, the access network element may directly generate, based on the first input information and the second input information, the key used to perform the key activation procedure. In this way, activation of a security protection function of the access network element may be determined by the access network element, without depending on a core network element such that security negotiation between the access network element and the terminal device can be more flexible.

In a possible design, the access network element first obtains security capability information of the terminal device, and then determines the second input information based on the security capability information.

In the foregoing technical solution, the access network element may determine, based on the security capability information of the terminal device, the information used by the access network element to generate the target key. A processing manner is simple, and operation complexity of the access network element is reduced.

In a possible design, the terminal device sends first Radio Resource Control (RRC) signaling to the access network element, and the access network element obtains the security capability information of the terminal device from the first RRC signaling.

In the foregoing technical solution, the access network element may directly obtain the security capability information of the terminal device using the RRC signaling from the terminal device. A new processing manner is provided. The access network element may select a manner based on an actual situation, to obtain the security capability information. This improves flexibility of the access network element.

In a possible design, the terminal device sends second RRC signaling to the access network element, and the access network element obtains, from the second RRC signaling, the first input information used by the terminal device to generate the target key.

In the foregoing technical solution, the access network element may directly obtain the first input information using the RRC signaling from the terminal device. A new processing manner is provided. The access network element may select a manner based on an actual situation, to obtain the first input information. This improves the flexibility of the access network element.

In a possible design, after the access network element generates the target key, the access network element may send, to the terminal device, a first message on which integrity protection is performed using the target key. After receiving the first message, the terminal device generates the target key based on content in the first message, and sends, to the access network element, a second message on which integrity protection processing is performed using the target key. After receiving the second message, the access network element verifies the second message using the target key generated by the access network element, and completes the key activation procedure when the verification succeeds.

In the foregoing technical solution, after generating the target key, the access network element completes the key activation procedure based on the target key. In this way, activation of the security protection function between the access network element and the terminal device may be determined by the access network element, without depending on the core network element such that the security negotiation between the access network element and the terminal device can be more flexible.

In a possible design, the access network element sends, to the terminal device, a third message signed using a public key. After receiving the third message, the terminal device verifies a signature of the third message using the public key. If the signature of the third message is correct, the terminal device generates a key used to perform the key activation procedure, based on content in the third message and the first input information that is used by the terminal device to generate the target key, then, sends the first input information to the access network element through a fourth message, and performs integrity protection processing on the fourth message using the target key. After receiving the fourth message, the access network element obtains the first input information from the fourth message.

In the foregoing technical solution, the access network element first transfers, to the terminal device using the public key, the second input information that is used by the access network element to generate the target key. In this way, security of the second input information can be ensured. In addition, the terminal device verifies, using the public key, the information sent by the access network element. In this way, correctness of the second input information can be ensured. In addition, the terminal device performs integrity protection on the fourth message using the target key such that correctness of the first input information obtained by the core network element can be ensured. In this way, the information transmitted between the access network element and the terminal device is protected using the public key and the target key. This can ensure consistency between the target key used by the terminal device and the target key used by the access network element.

In a possible design, after the access network element generates the target key, the access network element verifies the second message using the target key, and completes the key activation procedure when the verification succeeds.

In the foregoing technical solution, after generating the target key, the access network element completes the key activation procedure based on the target key. In this way, activation of the security protection function between the access network element and the terminal device may be determined by the access network element, without depending on the core network element such that the security negotiation between the access network element and the terminal device can be more flexible.

According to a third aspect, this application provides a key generation method. In the method, a terminal device receives a third message that is sent by an access network element and that is signed using a public key, and then the terminal device verifies a signature of the third message using the public key. If the signature is correct, the terminal device generates the target key based on content in the third message and first input information that is used by the terminal device to generate a key used to perform a key activation procedure.

In the foregoing technical solution, the access network element signs, using the public key, the information sent to the terminal device such that security of the third message can be ensured. In addition, the terminal device verifies the third message using the public key. When the verification succeeds, the terminal device generates the target key using the content in the third message. This can ensure correctness of the target key generated by the terminal device.

In a possible design, the third message includes second input information used by the access network element to generate the target key.

In the foregoing technical solution, the access network element may send, to the terminal device through the third message, the second input information used by the access network element to generate the target key. In this way, the terminal device directly generates the target key based on the second input information. This can reduce processing complexity of the access network element.

In a possible implementation, after the terminal device generates the target key, the terminal device may send, to the access network element, a fourth message on which integrity protection processing is performed using the target key.

In the foregoing technical solution, after generating the target key, the terminal device directly performs integrity protection on the fourth message using the target key, to ensure correctness of the fourth message such that the access network element can determine, based on the fourth message, a target key the same as that of the terminal device. This can ensure consistency between the target key used by the access network element and the target key used by the terminal device.

In a possible design, the fourth message includes the first input information.

In the foregoing technical solution, the terminal device directly sends, to a core network element through the fourth message, the first input information that is used by the terminal device to generate the target key such that the core network element may directly determine the target key using the first input information. This can reduce processing complexity of the access network element.

According to a fourth aspect, this application provides an apparatus. The apparatus may be an access network element, or may be an apparatus in an access network element. The apparatus may include a receiving module and a determining module. These modules may perform corresponding functions performed by the access network element in any design example of the first aspect. Details are as follows.

The receiving module is configured to receive a first message, the determining module is configured to determine, based on the first message, whether a second message needs to be sent to a terminal device, where the second message is used to trigger the terminal device to perform a key activation procedure, and a transmit module is configured to send the second message to the terminal device if the determining module determines that the second message needs to be sent to the terminal device.

In a possible design, for specific content included in the first message, refer to the specific description of the first message in the first aspect. This is not limited herein.

In a possible design, the transmit module is further configured to send a third message to a core network element, where the third message is used to request a parameter for triggering the key activation procedure.

In a possible design, the determining module is configured to determine, according to a preset policy and based on the first message, whether the second message needs to be sent to the terminal device.

According to a fifth aspect, this application provides an apparatus. The apparatus may be a core network element, or may be an apparatus in a core network element. The apparatus may include a communications module and a determining module. These modules may perform corresponding functions performed by the core network element in any design example of the first aspect. Details are as follows.

The determining module is configured to determine whether a terminal device needs to perform a key activation procedure, and the communications module is configured to send a first message to an access network element, where the first message is used to indicate whether the access network element needs to send a second message to the terminal device, and the second message is used to trigger the terminal device to perform the key activation procedure.

In a possible design, for specific content included in the first message, refer to the specific description of the first message in the first aspect. This is not limited herein.

In a possible design, the communications module is further configured to receive a fourth message, where the fourth message is used by the terminal device to access a core network or used by the terminal device to request to establish a connection to the core network element for sending service data.

In a possible design, the determining module may determine, in the following three manners, whether the key activation procedure needs to be performed. The three manners are as follows.

In a first manner, if a type of the fourth message is a type indicating that user plane data needs to be established, the determining module determines that the key activation procedure needs to be performed.

In a second manner, if determining, based on the fourth message, that a type of the terminal device is an eMBB type, the determining module determines that the key activation procedure needs to be performed.

In a third manner, if determining, based on the fourth message, that a latency required by a service needing to be performed by the terminal device is greater than a preset latency, the determining module determines that the key activation procedure needs to be performed.

In a possible design, the communications module is further configured to receive a third message sent by the access network element, where the third message is used to request a parameter for triggering the key activation procedure.

According to a sixth aspect, this application provides an apparatus. The apparatus may be an access network element, or may be an apparatus in an access network element. The apparatus may include a communications module and a determining module. These modules may perform corresponding functions performed by the access network element in any design example of the second aspect. Details are as follows.

The communications module is configured to obtain first input information and second input information, where the first input information is information that is obtained by a terminal device and that is used to generate a target key, the target key is a key used to perform a key activation procedure, and the second input information is information that is obtained by the access network element and that is used to generate the target key, and the determining module is configured to generate the target key based on the first input information and the second input information.

In a possible design, the communications module is configured to obtain security capability information of the terminal device, and determine the second input information based on the security capability information.

In a possible design, the communications module is configured to receive first RRC signaling sent by the terminal device, and obtain the security capability information from the first RRC signaling.

In a possible design, the communications module is configured to receive second RRC signaling sent by the terminal device, and obtain the first input information from the second RRC signaling.

In a possible design, the communications module is further configured to send a first message to the terminal device, where the first message is a message on which integrity protection is performed using the target key, and receive a second message sent by the terminal device, where integrity protection processing is performed on the second message using the target key, and the determining module is further configured to verify the second message using the target key, and complete the key activation procedure when the verification succeeds.

In a possible design, the communications module is configured to send a third message to the terminal device, where the third message is a message signed using a public key, receive a fourth message sent by the terminal device, where integrity protection processing is performed on the fourth message using the target key, and the fourth message includes the first input information, and obtain the first input information from the fourth message.

In a possible design, the determining module is further configured to verify the second message using the target key, and complete the key activation procedure when the verification succeeds.

According to a seventh aspect, this application provides an apparatus. The apparatus may be a terminal device, or may be an apparatus in a terminal device. The apparatus may include a communications module and a determining module. These modules may perform corresponding functions performed by the terminal device in any design example of the second aspect. Details are as follows.

The communications module is configured to receive a third message sent by an access network element, where the third message is a message signed using a public key, and the determining module is configured to verify a signature of the third message using the public key, and if the signature of the third message is correct, generate a target key based on the third message and first input information, where the first input information is information used by the apparatus to generate the target key, and the target key is a key used to perform a key activation procedure.

In a possible design, the third message includes second input information, and the second input information is information used by the access network element to generate the target key.

In a possible design, the communications module is further configured to send a fourth message to the access network element, where integrity protection processing is performed on the fourth message using the target key.

In a possible design, the fourth message includes the first input information.

According to an eighth aspect, this application provides an apparatus. The apparatus includes a processor configured to implement the method described in the first aspect. The apparatus may further include a memory configured to store a program instruction and data. The memory is coupled to the processor. The processor may invoke and execute the program instruction stored in the memory, to implement the method described in the first aspect. The apparatus may further include a communications interface, and the communications interface is used by the apparatus to communicate with another device. For example, the other device is a terminal device.

In a possible design, the apparatus includes the communications interface configured to receive a first message, the memory configured to store the program instruction, and the processor configured to determine, based on the first message, whether a second message needs to be sent to the terminal device, where the second message is used to trigger the terminal device to perform a key activation procedure, and send, using the communications interface, the second message to the terminal device if the second message needs to be sent to the terminal device.

In a possible design, for specific content included in the first message, refer to the specific description of the first message in the first aspect. This is not limited herein.

In a possible design, the communications interface is further configured to send a third message to a core network element, where the third message is used to request a parameter for triggering the key activation procedure.

In a possible design, the processor is further configured to determine, according to a preset policy and based on the first message, whether the second message needs to be sent to the terminal device.

According to a ninth aspect, this application provides an apparatus. The apparatus includes a processor configured to implement the method described in the first aspect. The apparatus may further include a memory configured to store a program instruction and data. The memory is coupled to the processor. The processor may invoke and execute the program instruction stored in the memory, to implement the method described in the first aspect. The apparatus may further include a communications interface, and the communications interface is used by the apparatus to communicate with another device. For example, the other device is a core network element.

In a possible design, the apparatus includes the processor configured to determine whether a terminal device needs to perform a key activation procedure, the communications interface configured to send a first message to an access network element, where the first message is used to indicate whether the access network element needs to send a second message to the terminal device, and the second message is used to trigger the terminal device to perform the key activation procedure, and the memory configured to store the program instruction.

In a possible design, for specific content included in the first message, refer to the specific description of the first message in the first aspect. This is not limited herein.

In a possible design, the communications interface is further configured to receive a fourth message, where the fourth message is used by the terminal device to access a core network or used by the terminal device to request to establish a connection to the core network element for sending service data.

In a possible design, the processor may determine, in the following three manners, whether the key activation procedure needs to be performed. The three manners are as follows.

In a first manner, if a type of the fourth message is a type indicating that user plane data needs to be established, the processor determines that the key activation procedure needs to be performed.

In a second manner, if determining, based on the fourth message, that a type of the terminal device is an eMBB type, the processor determines that the key activation procedure needs to be performed.

In a third manner, if determining, based on the fourth message, that a latency required by a service needing to be performed by the terminal device is greater than a preset latency, the processor determines that the key activation procedure needs to be performed.

In a possible design, the communications interface is further configured to receive a third message sent by the access network element, where the third message is used to request a parameter for triggering the key activation procedure.

According to a tenth aspect, this application provides an apparatus. The apparatus includes a processor configured to implement the method described in the second aspect. The apparatus may further include a memory configured to store a program instruction and data. The memory is coupled to the processor. The processor may invoke and execute the program instruction stored in the memory, to implement the method described in the second aspect. The apparatus may further include a communications interface, and the communications interface is used by the apparatus to communicate with another device. For example, the other device is a terminal device.

In a possible design, the apparatus includes the communications interface configured to obtain first input information and second input information, where the first input information is information that is obtained by the terminal device and that is used to generate a target key, the target key is a key used to perform a key activation procedure, and the second input information is information that is obtained by an access network element and that is used to generate the target key, the memory configured to store the program instruction, and the processor configured to generate the target key based on the first input information and the second input information.

In a possible design, the communications interface is configured to obtain security capability information of the terminal device, and determine the second input information based on the security capability information.

In a possible design, the communications interface is configured to receive first RRC signaling sent by the terminal device, and obtain the security capability information from the first RRC signaling.

In a possible design, the communications interface is configured to receive second RRC signaling sent by the terminal device, and obtain the first input information from the second RRC signaling.

In a possible design, the communications interface is further configured to send a first message to the terminal device, where the first message is a message on which integrity protection is performed using the target key, and receive a second message sent by the terminal device, where integrity protection processing is performed on the second message using the target key, and the determining module is further configured to verify the second message using the target key, and complete the key activation procedure when the verification succeeds.

In a possible design, the communications interface is configured to send a third message to the terminal device, where the third message is a message signed using a public key, receive a fourth message sent by the terminal device, where integrity protection processing is performed on the fourth message using the target key, and the fourth message includes the first input information, and obtain the first input information from the fourth message.

In a possible design, the processor is further configured to verify the second message using the target key, and complete the key activation procedure when the verification succeeds.

According to an eleventh aspect, this application provides an apparatus. The apparatus includes a processor configured to implement the method described in the second aspect. The apparatus may further include a memory configured to store a program instruction and data. The memory is coupled to the processor. The processor may invoke and execute the program instruction stored in the memory, to implement the method described in the second aspect. The apparatus may further include a communications interface, and the communications interface is used by the apparatus to communicate with another device. For example, the other device is an access network element.

In a possible design, the apparatus includes the communications interface configured to receive a third message sent by the access network element, where the third message is a message signed using a public key, the memory configured to store the program instruction, and the processor configured to verify a signature of the third message using the public key, and if the signature of the third message is correct, generate a target key based on the third message and first input information, where the first input information is information used by the apparatus to generate the target key, and the target key is a key used to perform a key activation procedure.

In a possible design, the third message includes second input information, and the second input information is information used by the access network element to generate the target key.

In a possible design, the communications interface is further configured to send a fourth message to the access network element, where integrity protection processing is performed on the fourth message using the target key.

In a possible design, the fourth message includes the first input information.

According to a twelfth aspect, this application further provides a computer-readable storage medium, including an instruction. When the instruction is run on a computer, the computer is enabled to perform the method according to the first aspect.

According to a thirteenth aspect, an embodiment of this application further provides a computer-readable storage medium, including an instruction. When the instruction is run on a computer, the computer is enabled to perform the method according to the second aspect or the third aspect.

According to a fourteenth aspect, this application provides a chip system. The chip system includes a processor, and may further include a memory, to implement the method according to the first aspect. The chip system may include a chip, or may include a chip and another discrete component.

According to a fifteenth aspect, this application provides a chip system. The chip system includes a processor, and may further include a memory, to implement the method according to the second aspect or the third aspect. The chip system may include a chip, or may include a chip and another discrete component.

According to a sixteenth aspect, this application provides a system. The system includes the apparatus according to the fourth aspect and the apparatus according to the fifth aspect.

According to a seventeenth aspect, this application provides a system. The system includes the apparatus according to the sixth aspect and the apparatus according to the seventh aspect.

According to an eighteenth aspect, this application provides a system. The system includes the apparatus according to the eighth aspect and the apparatus according to the ninth aspect.

According to a nineteenth aspect, this application provides a system. The system includes the apparatus according to the tenth aspect and the apparatus according to the eleventh aspect.

For beneficial effects of the fourth aspect to the nineteenth aspect and the implementations thereof, refer to the descriptions of the beneficial effects of the methods according to the first aspect to the third aspect and the implementations thereof.

DESCRIPTION OF EMBODIMENTS

Figure 1:
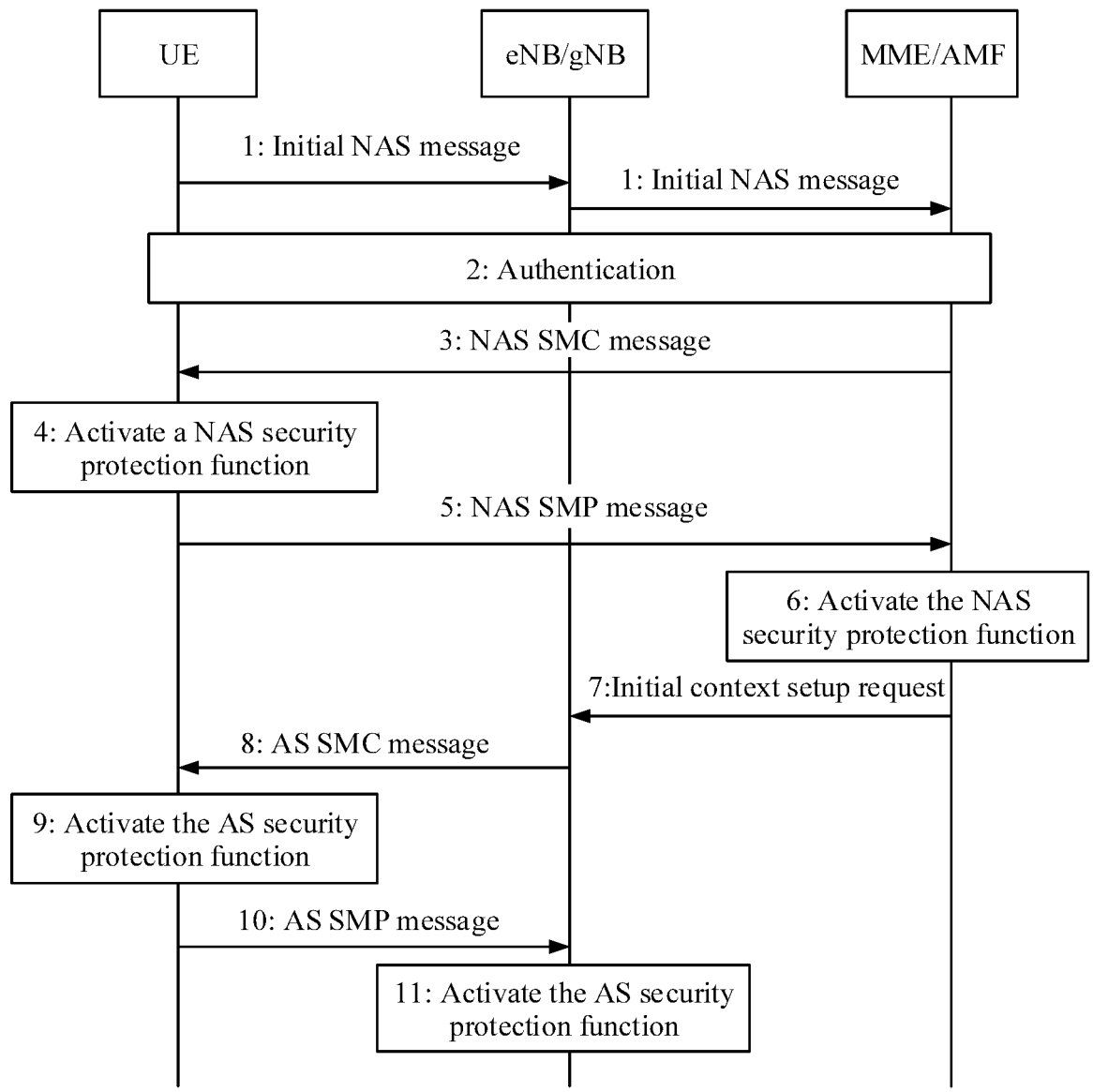
FIG. 1 is a flowchart of an activation procedure of a security protection function between a terminal device and a core network.

The following clearly describes technical solutions in embodiments of this application with reference to the accompanying drawings in the embodiments of this application.

In the following, some terms of the embodiments of this application are described, to help a person skilled in the art have a better understanding.

(1) A key activation procedure may include an AS security mode command (SMC) procedure and/or a NAS SMC procedure. Certainly, the key activation procedure may alternatively be another key activation procedure for activating a security key and protecting a subsequent message. This is not limited herein.

(2) A network exposure function (NEF) network element is mainly configured to interact with a third party such that the third party may indirectly interact with some network elements in a 3rd Generation Partnership Project (3GPP) network.

(3) A network function (NF) repository function (NRF) network element is configured to support registration, status monitoring, and the like of a network function service, to implement automatic management, selection, and scalability of the network function service.

(4) A policy control function (PCF) network element is configured to store or generate a session management-related rule, such as a session quality of service (QoS) rule, and provide the rule to a session management function (SMF) entity, and is further configured to generate mobility management-related policy information and provide the policy information to an access and mobility management function (AMF) entity.

(5) A unified data management (UDM) network element stores subscription information of a terminal device.

(6) An application function (AF) network element is configured to interact with the PCF entity, and provide a service requirement of the third party to the PCF entity such that the PCF entity generates a corresponding QoS rule based on the service requirement.

(7) An authentication server function (AUSF) network element is configured to obtain a security authentication vector, and the security authentication vector is used to perform security authentication between the terminal device and a network side.

(8) The AMF network element is configured to perform functions such as authentication on the terminal device, mobility management of the terminal device, network slice selection, and SMF entity selection, serve as an anchor for N1 and N2 signaling connections and provide the SMF entity with routing of N1 and N2 session management (SM) messages, and maintain and manage status information of the terminal device.

(9) A security anchor function (SEAF) network element is configured to initiate an authentication request to the AUSF entity, to complete authentication performed by the network side on the terminal device.

(10) The SMF network element is configured to manage all control plane functions of the terminal device, including user plane function (UPF) entity selection, Internet Protocol (IP) address assignment, session QoS attribute management, obtaining a policy control and charging (PCC) rule from the PCF entity, allocating a session resource to a user plane, and the like.

(11) A UPF entity, as an anchor of a protocol data unit (PDU) session connection, is responsible for data packet filtering, data transmission or forwarding, rate control, charging information generation, and the like of the terminal device.

(12) A data network (DN) entity is configured to generate downlink data that needs to be sent to the terminal device, and receive uplink data sent by the terminal device.

(13) A (radio) access network ((R)AN) is a network including a plurality of (R)AN nodes, implements a radio physical layer function, resource scheduling and radio resource management, a radio access control and mobility management function, and establishes a control plane signaling connection to the AMF entity to implement a function such as radio access bearer control. (R)ANs may be access networks using different access technologies, for example, a 3GPP access technology or a non-3GPP access technology. The (R)AN network element may also be referred to as an access network element, for example, a base station which may be a gNodeB (gNB) in a New Radio (NR) system, an evolved NodeB (eNB or eNodeB) in a Long-Term Evolution (LTE) system, an NR controller, a centralized unit, a radio remote unit, a micro base station, a distributed unit, a transmission reception point (TRP) or a transmission point (TP), a wireless controller in a cloud RAN (CRAN) scenario, or the network device may be a relay station, an access point, a vehicle-mounted device, a wearable device, a network device in a future evolved Public Land Mobile Network (PLMN), or any other radio access device. However, the embodiments of this application are not limited thereto. The access network element allocates an appropriate resource to a user plane transmission path according to the QoS rule provided by the SMF entity.

(14) The terminal device may be a wireless terminal device or a wired terminal device. When performing authentication with another network element such as the AMF entity or the AUSF entity, the terminal device verifies authenticity of a network using a long-term key and a related function that are stored in the terminal device. The wireless terminal device may be a device that provides a user with voice and/or data connectivity, a handheld device with a wireless connection function, or another processing device connected to a wireless modem. The wireless terminal device may communicate with one or more core networks through the RAN. The wireless terminal device may be a mobile terminal device, such as a mobile phone (or as a "cellular" phone) or a computer with a mobile terminal device. For example, the wireless terminal device may be a portable, pocket-sized, handheld, computer built-in, or vehicle-mounted mobile apparatus, which exchanges a voice and/or data with the radio access network. For example, the mobile apparatus may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile, a remote station (RS), an access point (AP), a remote terminal (RT), an access terminal (AT), a user terminal (UT), a user agent (UA), a terminal device (UD), or user equipment (UE).

In addition, the term "and/or" in this specification describes only an association relationship for describing associated objects and represents that three relationships may exist. For example, A and/or B may represent the following three cases only A exists, both A and B exist, and only B exists. In addition, the character "/" in this specification generally indicates an "or" relationship between the associated objects, if without special explanation.

Some English abbreviations in this specification are described in the embodiments of this application using a 4G system and a current 5G system as examples. The abbreviations may change with network evolution. For specific evolution, refer to descriptions in a corresponding standard.

It should be understood that each entity in this specification may be physically a single device, or two or more entities may be integrated into a same physical device. This is not limited in the embodiments of the present disclosure.

To better understand the technical solutions provided in the embodiments of this application, the following first describes an activation procedure of a security protection function between a terminal device and a core network in a 4G system. As shown in FIG. 1, in the current 4G system, the activation procedure of the security protection function between the terminal device and the core network is described as follows.

1: The terminal device sends an initial NAS message to an MME entity through an access network element, where the initial NAS message may be an attach request.

2: The MME entity and the terminal device perform authentication on each other.

3: After authentication performed by the MME entity and the terminal device succeeds, the MME entity sends a NAS SMC message to the terminal device, and the terminal device receives the NAS SMC message.

4: The terminal device activates a NAS security protection function based on the NAS SMC message.

5: After activating NAS security, the terminal device sends a NAS security mode complete (SMP) message to the MME entity, and the MME entity receives the NAS SMP message.

6: The MME entity activates the NAS security protection function based on the NAS SMP message.

7: After the MME entity completes a NAS security verification process with the terminal device, the MME entity sends an initial context setup request message to the access network element, and the access network element receives the initial context setup request message, where the initial context setup request message carries a security context.

8: The access network element sends an AS SMC message to the terminal device based on the security context, and the terminal device receives the AS SMC message.

9: The terminal device activates an AS security protection function based on the AS SMC message.

10: After activating AS security, the terminal device sends an AS SMP message to the MME entity, and the MME entity receives the AS SMP message.

11: The MME entity activates the AS security protection function based on the AS SMP message, to complete the activation procedure of the security protection function.

It can be learned that the activation procedure of the security protection function in other approaches is relatively complex. The NAS security protection function needs to be activated first, and then the AS security protection function is activated. The activation procedure of the security protection function causes a relatively long latency, and cannot meet a flexibility requirement of a 5G system. Therefore, the embodiments of this application provide an information sending method, applied to an activation procedure of a security protection function in the 5G system. In the method, an access network element first determines whether to activate the security protection function with a terminal device, and triggers the activation procedure of the security protection function if the security protection function needs to be activated. In this way, the activation procedure of the security protection function may be selectively performed based on an actual situation, and the flexibility requirement of the 5G system can be met.

The technical solutions in the embodiments of this application may be applied to various communications systems, for example, an NR system, an LTE system, a LTE-advanced (LTE-A) system, a cellular system related to the 3GPP, a 5G system, and a next-generation mobile communications system.

In addition, the communications system may be further applicable to a future-oriented communications technology. The systems described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

Figure 2:
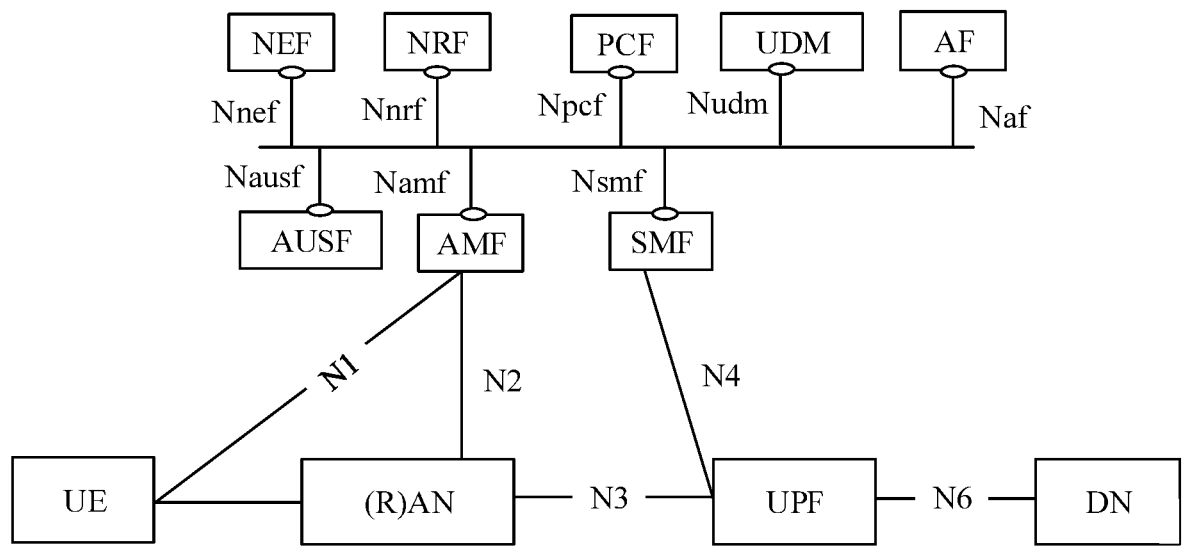
FIG. 2 is a structural diagram of a communications system according to an embodiment of this application.

An application scenario of the embodiments of this application is briefly described below. FIG. 2 is a structural diagram of a communications system according to an embodiment of this application. Functions of network elements in the communications system have been described above, and details are not described herein again.

The following describes the technical solutions provided in the embodiments of this application with reference to the accompanying drawings. In the following description process, an example in which the technical solutions provided in this application are applied to the application scenario shown in FIG. 2 is used.

Figure 3A:
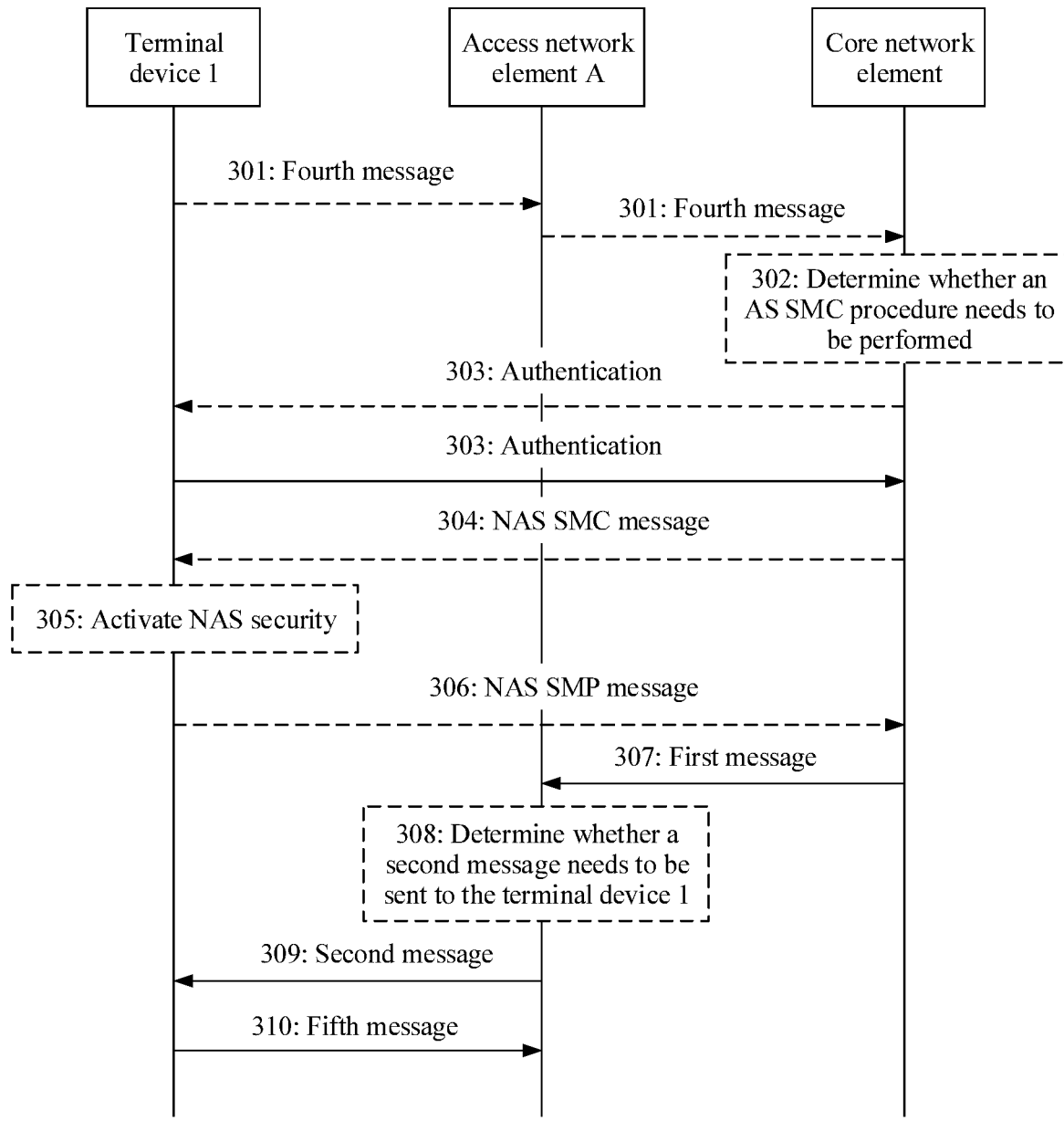
FIG. 3A, FIG. 3B, and FIG. 3C each are a flowchart of an information sending method according to an embodiment of this application.
Figure 3B:
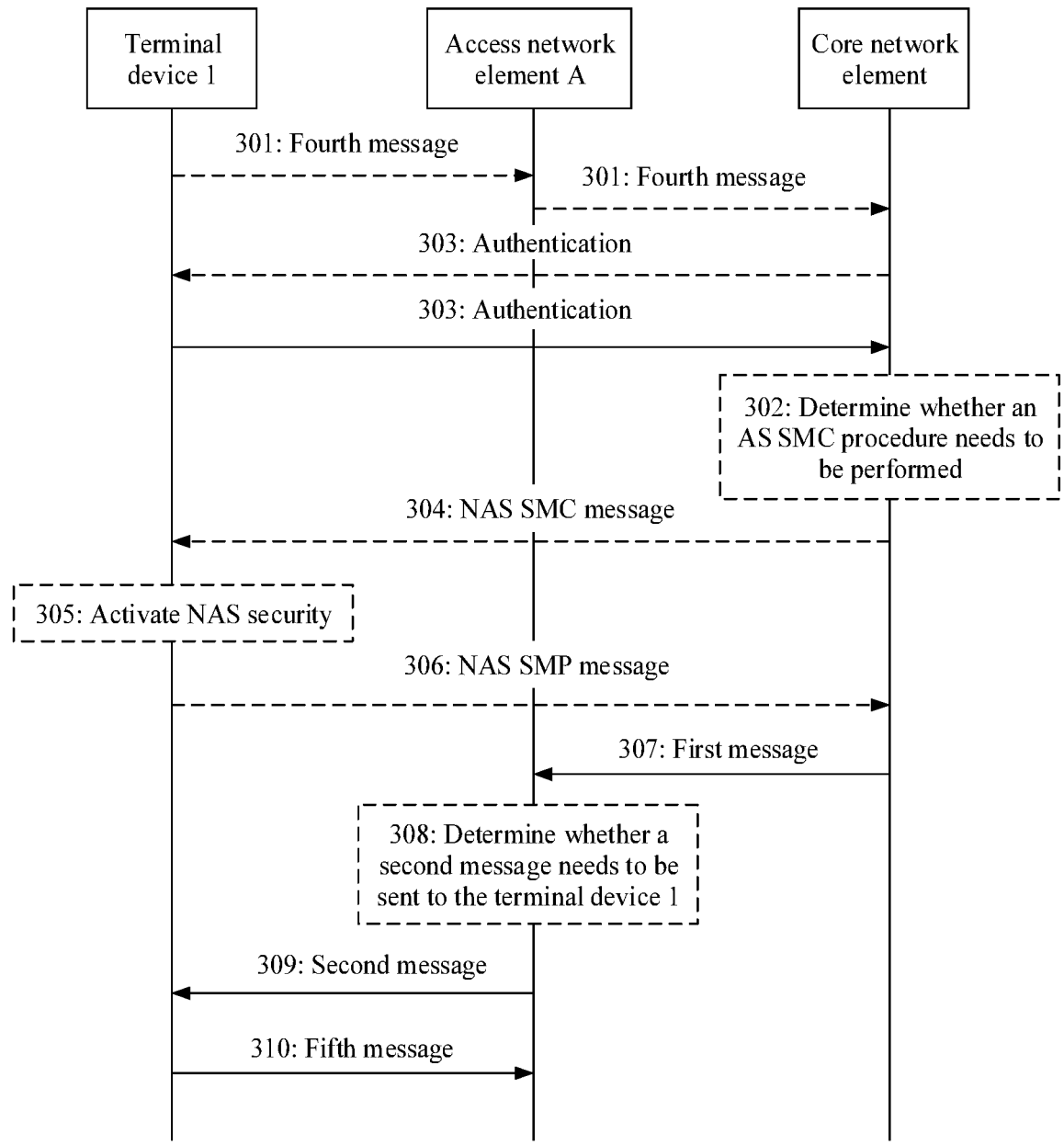
Figure 3C:
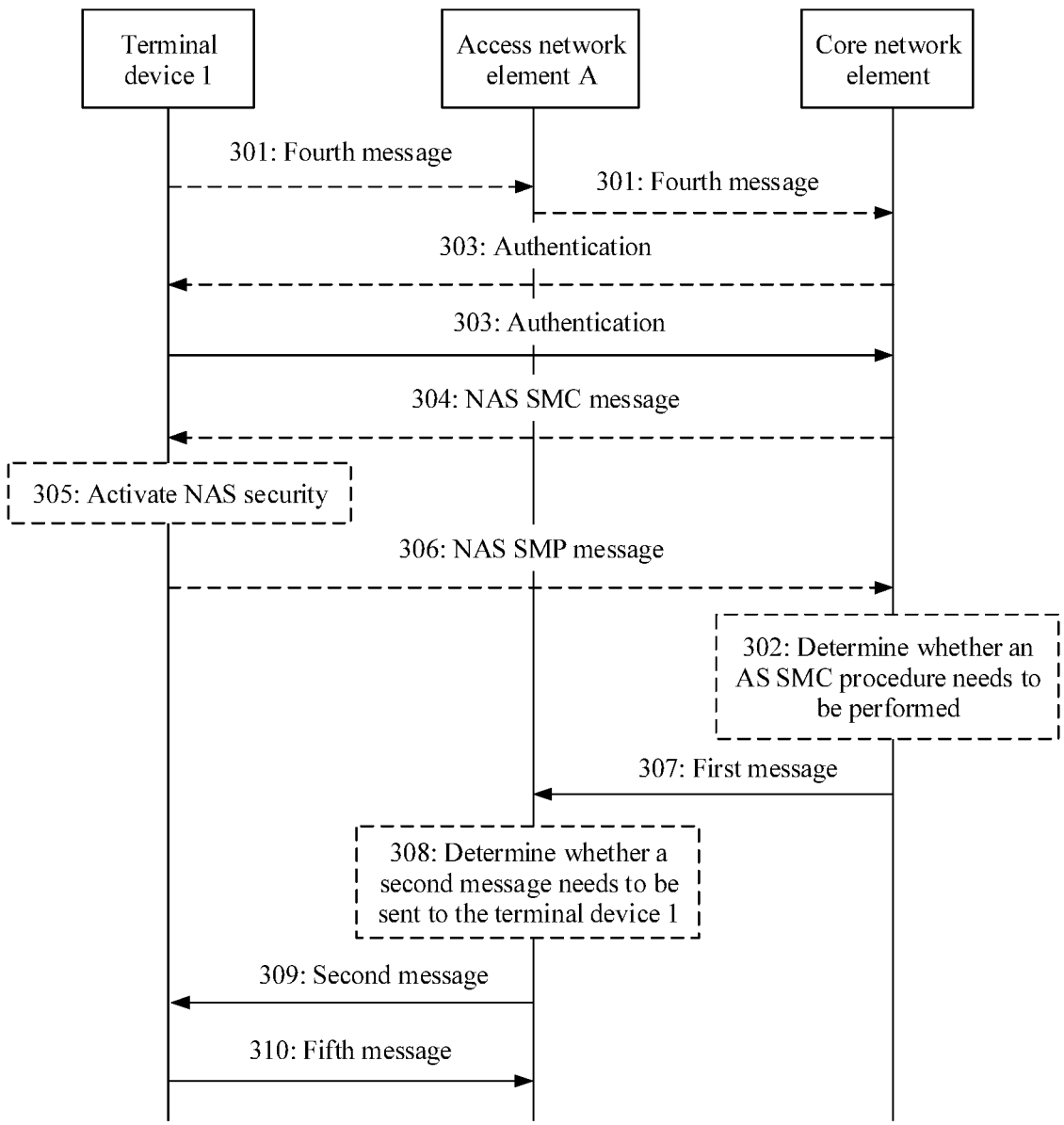

FIG. 3A to FIG. 3C each are a flowchart of an information sending method according to an embodiment of this application. The flowchart is described as follows.

Step 301: A terminal device sends a fourth message to a core network element, and the core network element receives the fourth message.

In the embodiments of this application, the core network element is, for example, a single network entity shown in FIG. 2, for example, the AMF entity or the SMF entity. Alternatively, the core network element may be a combination of a plurality of network entities, for example, may be a combination of the AMF entity and the SMF entity (representing a combination of two signaling plane function entities), may be a combination of the AUSF entity, the AMF entity, and the SEAF entity (representing a combination of a security function entity and a signaling plane security entity), may be a combination of the multi-access edge computing (MEC) entity and the UPF entity (representing a combination of two user plane security entities), may be a combination of the SMF entity and the UPF entity (representing a combination of a signaling plane security entity and a user plane security entity), or may be a combination of the UPF entity and the SEAF entity (representing a combination of a user plane entity and a security function entity). When the core network element is the combination of the UPF entity and the SEAF entity, the core network element may not be standardized. In addition, the core network element may be a network function corresponding to a service. For example, the network function may be understood as a virtualization function implemented through virtualization, or may be understood as a network function that provides a service in a service-based network, for example, a network function specially used for a registration procedure of the terminal device, or a network function specially used to provide video service data to the terminal device. Certainly, in this case, the core network element may be a single network function, or may be a combination of network functions corresponding to a plurality of services. A specific combination example may be similar to the combination of a plurality of network entities. To be specific, combinations of different functions corresponding to different services may be provided. Details are not described herein again. Therefore, the core network element in the present disclosure may be the combination of a plurality of core network elements. To be specific, after several core network elements communicate with each other, one core network element serves as an egress to interact with an access network device.

It should be noted that, in the embodiments of this application, names such as the network entity, the network element, and the device are equivalent, and a specific name is not limited. In the following description, the core network element is used for description. Because there is a plurality of terminal devices connected to the core network element, for ease of description, the following uses a terminal device 1 as an example for description.

In the embodiments of this application, the fourth message is used by the terminal device 1 to access a core network or used by the terminal device 1 to request the core network element to establish a connection for sending service data. For example, the fourth message may be a NAS message such as an initial registration request message or a service request message. When the terminal device 1 needs to register with the core network or request service data from the core network, the terminal device 1 sends the fourth message to the core network element.

Step 302: The core network element determines whether the terminal device 1 needs to perform a key activation procedure.

In the embodiments of this application, the key activation procedure may be an AS SMC procedure, or may be another key activation procedure that activates a security key and protects a subsequent message. In the following description, the AS SMC procedure is used as an example for description.

After receiving the fourth message, the core network element determines whether the terminal device 1 needs to perform the AS SMC procedure. In this embodiment of this application, a specific manner in which the core network element determines whether the terminal device 1 needs to perform the AS SMC procedure may be at least one of the following plurality of manners.

First Determining Manner:

The core network element determines a type of the fourth message, and determines, based on the type of the fourth message, whether the terminal device 1 needs to perform the AS SMC procedure. If the type of the fourth message is a type indicating that a transmission path of user plane data needs to be established, the core network element determines that the AS SMC procedure needs to be performed.

In a possible implementation, the core network element may determine the type of the fourth message based on information carried in the fourth message. For example, if the fourth message carries content related to a PDU session, the core network element determines that the fourth message is of the type indicating that the user plane data needs to be established, and determines that the AS SMC procedure needs to be performed, or if the fourth message does not carry content related to a PDU session, the core network element determines that the fourth message is a type indicating that the user plane data does not need to be established. Alternatively, if the fourth message is a service request message, the core network element determines that the fourth message is of the type indicating that the user plane data needs to be established, otherwise, the core network element determines that the fourth message is of the type indicating that the user plane data does not need to be established. Certainly, another determining manner may also be used. This is not limited herein.

Second Determining Manner:

The core network element determines a type of the terminal device 1, and determines, based on the type of the terminal device 1, whether the AS SMC procedure needs to be performed. If the type of the terminal device 1 is an eMBB type, the core network element determines that the AS SMC procedure needs to be performed.

In a possible implementation, after receiving the fourth message, the core network element may obtain information related to the terminal device 1 from another network element such as the SMF entity or the UDM entity, and determines, based on the fourth message and the obtained information related to the terminal device 1, whether the AS SMC procedure needs to be performed. For example, the core network element may determine the type of the terminal device 1 based on a field in the fourth message, subscription information of the terminal device 1 in the UDM entity, location information of the terminal device 1 sent by the PCF entity, and the like. For example, if the terminal device 1 is of the eMBB type, the core network element determines that the AS SMC procedure needs to be performed. If the terminal device 1 is of an mMTC type or a URLLC type, the core network element determines that the AS SMC procedure does not need to be performed. For another example, if the terminal device 1 is a vehicle or a vehicle-mounted module, the core network element determines that the AS SMC procedure does not need to be performed. If the terminal device 1 is a mobile phone, the core network element determines that the AS SMC procedure needs to be performed. Certainly, if the type of the terminal device 1 is another type, the foregoing manner may also be used for determining. Details are not described herein again.

Third Determining Manner:

The core network element determines whether the AS SMC procedure needs to be performed, based on QoS related information carried in the fourth message or based on QoS information that is obtained from another core network element after receiving the fourth message. For example, the core network element may determine, based on the QoS related information, a latency required by a service requested by the terminal device 1, and then determines, based on the latency, whether the AS SMC procedure needs to be performed. For example, if the latency required by the service requested by the terminal device 1 is greater than a preset latency, the core network element determines that the AS SMC procedure needs to be performed. If the latency required by the service requested by the terminal device 1 is less than or equal to the preset latency, the core network element determines that the AS SMC procedure does not need to be performed. For example, if the preset latency is 1 s, and the core network element determines, based on the fourth message, that the latency required by the service requested by the terminal device 1 is 0.5 s, because 0.5 s<1 s, the core network element determines that the AS SMC procedure does not need to be performed.

Fourth Determining Manner:

The core network element may obtain, from another network element such as the PCF entity, the AF entity, or a management network element entity, status information of an external network that the terminal device 1 requests to access, for example, slice-related information of the network that the terminal device 1 requests to access, and a data network name (DNN) of the network that the terminal device 1 requests to access, determines the network that the terminal device 1 requests to access, and determines whether the AS SMC procedure needs to be performed, based on the status information of the network that the terminal device 1 requests to access. For example, if the terminal device 1 requests to access a network with a requirement for an extremely low latency, the network requires the terminal device 1 to access the network at a fastest speed, and the core network element determines that the AS SMC procedure does not need to be performed. Alternatively, the core network element may obtain load information of an access network that the terminal device 1 requests to access. If load of the network that the terminal device 1 requests to access does not exceed a threshold, the core network element determines that the AS SMC procedure needs to be performed. Certainly, determining may alternatively be performed based on other information of the network that the terminal device 1 requests to access. The information is not listed one by one herein.

Fifth Determining Manner:

The core network element may obtain, from the core network element or another network element such as the PCF entity or the AF entity, status information of an access network element currently accessed by the terminal device 1, and determine, based on the status information of the currently accessed access network element, whether the AS SMC procedure needs to be performed. In a possible implementation, the core network element may obtain location information of the access network element currently accessed by the terminal device 1. For example, when the currently accessed access network element is deployed in a desert, and there are no other networks nearby, the core network element determines that the AS SMC procedure does not need to be performed. If the currently accessed access network element is deployed in a business area, the core network element determines that the AS SMC procedure needs to be performed. Certainly, the determining may alternatively be performed based on other information of the currently accessed network. The information is not listed one by one herein.

Sixth Determining Manner:

A policy configured by the core network element or a policy provided by a network management system is used to determine whether the AS SMC procedure needs to be performed. The configured policy may be an operator policy. For example, the operator policy may be that the AS SMC procedure is not performed for all UEs such that the core network element determines that the terminal device 1 does not need to perform the AS SMC procedure. If the operator policy is that the AS SMC procedure needs to be performed for all UEs, the core network element determines that the terminal device 1 needs to perform the AS SMC procedure.

Seventh Determining Manner:

After receiving the fourth message, the core network element may determine, based on indication information carried in the fourth message, whether the AS SMC procedure needs to be performed. The indication information may be from the access network element, or may be from the terminal device 1. For example, the terminal device 1 may include bit indication information in the fourth message, and the bit indication information is used to indicate to the core network element whether the AS SMC procedure needs to be performed. For another example, the access network device may include bit indication information in an N2 message used to send the fourth message, and the bit indication information is used to indicate to the core network element whether the AS SMC procedure needs to be performed.

It should be noted that the core network element may perform determining in one of the foregoing seven manners, or may set priorities for the foregoing seven manners. When a plurality of determining manners may be used for determining, a specific determining manner is preferentially used. Alternatively, a correspondence between each determining manner and an actual case may be set, and a specific determining manner used in a specific case is not limited in the embodiments of this application.

It should be noted that step 301 and step 302 are optional steps, that is, are not mandatory.

Step 303: The core network element and the terminal device 1 perform authentication on each other.

Step 304: The core network element sends a NAS SMC message to the terminal device 1, and the terminal device 1 receives the NAS SMC message.

Step 305: The terminal device 1 activates NAS security based on the NAS SMC message.

Step 306: The terminal device 1 sends a NAS SMP message to the core network element, and the core network element receives the NAS SMP message and activates NAS security.

Step 303 to step 306 are the same as corresponding steps in FIG. 1. Details are not described herein again.

It should be noted that, an execution sequence of step 302 and step 303 to step 306 may be as follows. As shown in FIG. 3A, step 302 is first performed, and then step 303 to step 306 are performed, as shown in FIG. 3B, step 303 is first performed, then step 302 is performed, and finally step 304 to step 306 are performed, as shown in FIG. 3C, step 303 to step 306 are first performed, and then step 302 is performed. An execution sequence of step 302 and step 303 to step 306 is not limited in the embodiments of this application.

In a possible implementation, step 302 may be performed for a plurality of times. To be specific, step 302 is first performed, then step 303 to step 306 are performed, and then step 302 is performed again. Alternatively, step 303 is first performed, then step 302 is performed, then step 304 to step 306 are performed, and finally step 302 is performed again. In this case, a determining result of step 302 may be indicated after the first determining using one or more of seven types of information in the foregoing first message, or may be indicated after step 302 is performed for the last time. The core network element may preconfigure an occasion for performing step 302, a quantity of times of performing step 302, and an occasion for indicating the determining result of step 302. This is not limited herein.

It should be noted that step 303 to step 306 are optional steps and are not mandatory. To be specific, after receiving the fourth message sent by the terminal device 1, the core network element may perform step 303 to step 306 to perform an authentication and NAS security verification process, or may not perform the verification process in step 303 to step 306. This is not limited herein.

Step 307: The core network element sends the first message to the access network element, and the access network element receives the first message.

In the embodiments of this application, the access network element may be understood as a conventional access device in a 3GPP network, for example, an eNB in 4G, a gNB in 5G, or various upgraded or evolved 3GPP access technologies. A deployment form of the access network device is not specified in the present disclosure. In the present disclosure, the access network device represents a device having an access network function, to be specific, may include a front-end base station and a back-end data center in cloud deployment. In addition, it is not excluded herein that the access network device is a wireless access point AP or various gateway devices in a non-3GPP access technology, for example, an Evolved Packet Data Gateway (ePDG), non-3GPP InterWorking Function (N3IWF), and a gateway used in a fixed network access technology.

It should be noted that in the embodiments of this application, names such as the network entity, the network element, and the device are equivalent, and a specific name is not limited. Because there is a plurality of access network elements connected to the core network element, for ease of description, an access network element A is used as an example for description in the following.

The following describes the first message.

In the embodiments of this application, the first message is a message received by the access network element A from the core network element. The message may be used to provide reference information to the access network device A such that the access network device A can use the reference information to determine whether the AS SMC procedure needs to be triggered, or the message may be used to transfer a necessary parameter for enabling the access network device A to trigger the AS SMC procedure. Forms of the first message include but are not limited to the following three types.

In a first form, the first message is a message similar to an initial context setup request message. In the 5G access technology, the initial context setup message is used to transfer a security context from the core network element to the access network element.

In this case, content included in the first message may be the same as content included in the initial context setup request message in FIG. 1, and the specific included information is not described again.

In a second form, the first message may include information in an initial context setup request message, and further include other information. The other information may be used by the access network element A to determine whether the AS SMC procedure with the terminal device needs to be triggered.

In an example, the other information includes at least one of the following information (1) Key Used to Perform the AS SMC Procedure.

For example, the core network element may store, obtain, or temporarily generate a root key KgNB that corresponds to each terminal device accessing the core network and that is used to perform the AS SMC procedure, and store a plurality of algorithms used to generate, based on the root keys KgNB, keys used to perform the AS SMC procedure. Therefore, when the core network element needs to trigger an AS SMC procedure between the access network element A and a terminal device, the core network element generates, based on a root key KgNB corresponding to the terminal device and a selected algorithm, a key used to perform the AS SMC procedure between the access network element A and the terminal device. Certainly, there is a mapping relationship among the root key KgNB, the algorithm, and a plurality of sets of keys. In this case, the key may alternatively be a set of keys selected by the core network element from the plurality of sets of pre-stored keys based on the root key KgNB and the selected algorithm. A manner for obtaining the key is not limited herein.

It should be noted that the terminal device is a terminal device with which the access network element A needs to interact. For ease of description, the terminal device is referred to as a terminal device 1 in the following description.

(2) Root Key KgNB Used to Generate the Key for Performing the AS SMC Procedure.

For example, the root key may be the KgNB. For a description of the KgNB, refer to the description in (1). Details are not described herein again. The root key may alternatively be another key other than the KgNB. This is not limited herein. After receiving the root key, the access network device A may further generate a key for performing the AS SMC procedure between the access network device A and the terminal device 1, or directly protect an AS SMC message using the root key.

(3) Key Identifier Used to Indicate the Key for Performing the AS SMC Procedure.

If the core network element stores a plurality of sets of keys corresponding to the terminal device 1, the key identifier is used to identify a set of keys that is in the plurality of sets of keys and that is determined by the core network element to be used when the access network element A performs the AS SMC procedure with the terminal device 1. In this way, when the core network element and the terminal device 1 each store the plurality of sets of keys, the key used in this AS SMC procedure may be accurately determined using the key identifier.

It should be noted that the key determined using the key identifier may be a group of keys, or may be a specific key. This is not limited herein. If a group of keys is determined, the core network element may directly use one of the group of keys as the root key or as the key used for the AS SMC procedure, or may use one of the group of keys to further obtain the root key or the key used for the AS SMC procedure. For example, if a value of the key identifier is 001, it indicates that the two parties protect the AS SMC message using a key in a set of keys identified by 001 or using a key derived from a key in the set of keys.

(4) Indication Information, Used to Indicate Whether the AS SMC Procedure Needs to be Triggered.

The indication information may be bit indication information or a character string. To distinguish the indication information from other types of information, the indication information may also be referred to as an explicit notification, and a method for carrying the root key or other information may also be referred to as an implicit notification.

A possible implementation method may be as follows. The indication information is bit indication information of 0 or 1. To be specific, 0 indicates that the AS SMC procedure does not need to be triggered. 1 indicates that the AS SMC procedure needs to be triggered.

In another possible implementation, the indication information may be used to indicate three different types of content. The AS SMC procedure needs to be triggered, the AS SMC procedure is recommended to be triggered, and the AS SMC procedure does not need to be triggered. If the indication information indicates that the AS SMC procedure needs to be triggered, the access network element A needs to trigger the AS SMC procedure. If the indication information indicates that the AS SMC procedure is recommended to be triggered, the access network element may choose to trigger the AS SMC procedure, or may choose to not trigger the AS SMC procedure. If the indication information indicates that the AS SMC procedure does not need to be triggered, the access network element A chooses to not trigger the AS SMC procedure. The indication information may occupy 2 bits. For example, 00 indicates that the AS SMC procedure does not need to be triggered, 01 indicates that the AS SMC procedure needs to be triggered, and 10 indicates that the AS SMC procedure is recommended to be triggered. Alternatively, the indication information may include several character strings. For example, "not needed" indicates that the AS SMC procedure does not need to be triggered, "required" indicates that the AS SMC procedure needs to be triggered, and "preferred" indicates that the AS SMC procedure is recommended to be triggered. A specific form of the indication information is not limited herein.

(5) Type of the Terminal Device 1:

There may be a plurality of types of terminal devices, for example, a massive machine type communication (mMTC) type, an ultra-reliable low-latency communication (URLLC) type, and an eMBB type. Certainly, as application scenarios increase, the types of the terminal devices may also include another type, or may be classified into other types based on another factor. This is not limited herein.

It should be noted that the core network element may obtain the type of the terminal device 1 through a plurality of methods. For example, the core network element learns of the type of the terminal through subscription information, or the terminal device 1 may report the type of the terminal device 1 to the core network element when accessing the network. A specific method used by the core network element to learn of the type of the terminal device 1 is not limited in the present disclosure.

(6) Latency Required by a Service Needing to be Performed by the Terminal Device 1:

The latency may be a specific latency required by the service needing to be performed by the terminal device 1. For example, the latency may be 0.5 seconds (s), 1 s, or the like. In other words, a network latency cannot be greater than 0.5 s or 1 s. Alternatively, the latency may be indication information, and the indication information indicates a level of the latency required by the terminal device 1. For example, the access network element A and the core network element agree on that a latency within a range of 0 s to 1 s (including 0 s and 1 s) is at a low level, a latency within a range of 1 s to 2 s (including 1 s and 2 s) is at a medium level, and a latency within a range of 2 s to 3 s (including 2 s and 3 s) is at a high level. If the latency required by the terminal device 1 is 0.5 s, the level of the latency required by the terminal device 1 is the low level.

It should be noted that the core network element may obtain, through a plurality of methods, an acceptable value of the latency required by the terminal device, for example, through the subscription information, through another core network element, or through information reported by the terminal device 1. For example, the core network element obtains latency information of the UE from AMF subscription information, or the SMF function obtains latency information of the UE from the PCF or the subscription information, and then the SMF function may notify the core network device whether the AS SMC procedure is needed, or may notify the core network device, through the AMF function, whether the AS SMC procedure is needed, or the SMF function notifies the AMF of the latency information, and then the AMF notifies the access network device after performing determining, whether the AS SMC procedure is needed.

(7) Deployment Environment of an Access Network Element Currently Accessed by the Terminal Device 1:

In the embodiments of this application, the access network element currently accessed by the terminal device 1 is the access network element A, and the deployment environment of the access network element currently accessed by the terminal device 1 is a deployment environment of the access network element A. For example, the deployment environment may be a desert environment, a residential area, a business area, or the like. The deployment environment may also be used to represent a probability that the deployment environment of the access network element A is attacked by a third party. The third party may be a person or an application requesting a service. For example, if the deployment environment of the access network element A is a desert environment, it indicates that the access network element A has a low probability of being attacked by the third party, or if the deployment environment of the access network element A is a business area, it indicates that the access network element A has a high probability of being attacked by the third party. This is not limited herein.

It should be noted that the other information may be the determining result in step 302. To be specific, after the core network element performs step 302, the core network element may send the determining result in step 302 to the access network element A through one or more of the foregoing seven types of information in the first message. Further, the manner in which the core network element determines whether the AS SMC procedure needs to be performed is not in a one-to-one correspondence with the form of the other information in the first message. To be specific, regardless of the manner in which the core network element determines whether the AS SMC procedure needs to be performed, the other information in the first message may be one or more of the seven types of information included in the first message. For example, if the core network element determines, in the first manner, that the AS SMC procedure needs to be performed, the core network element may notify the access network element A of the determining result through the information of the type (1) in the first message, namely, the key used to perform the AS SMC procedure. If the core network element determines, in the second manner, that the AS SMC procedure needs to be performed, the core network element may notify the access network element A of the determining result through the information of the type (4) in the first message, namely, the indication information. Certainly, for simplification of calculation complexity of the core network device, when the core network element determines that the AS SMC procedure needs to be performed, in the third manner, to be specific, using the latency required by the service requested by the terminal device 1, the core network element may notify the access network element A of the determining result through the information of the type (6) in the first message. This is not limited in the embodiments of this application.

In a third form, the first message includes only information used by the access network element A to determine whether the AS SMC procedure with the terminal device 1 needs to be triggered. In this case, the first message and the initial security context setup request message shown in FIG. 1 may be understood as two different messages. The information used by the access network element A to determine whether the AS SMC procedure with the terminal device 1 needs to be triggered may be considered to be the same as the other information in the second form. For details, refer to the related description in the second form. Details are not described herein again.

Step 308: The access network element A determines, based on the first message, whether a second message needs to be sent to the terminal device 1.

In the embodiments of this application, the second message is used to trigger the terminal device 1 to perform an AS SMC procedure. For example, the second message may be the AS SMC message shown in FIG. 1, or certainly, may be another type of message used to activate the security protection function. This is not limited in the embodiments of this application.

The core network element notifies the access network element A of the determining result of the core network element, and whether the access network element A complies with the result of the core network element needs to be determined based on different cases. For example, it may be specified that the access network element A needs to comply with a decision of the core network element, and in this case, the access network element A may perform determining based on the content in the first message. It may alternatively be specified that the access network element A makes a decision based on both a current situation of the access network element A and the content in the first message, or the access network element A makes a decision again based on a current situation of the access network element A. A behavior of the access network element is also affected by different regulations. For example, it is specified that the access network device A needs to comply with the decision of the core network element, but when the access network element A cannot meet the decision of the core network element, the access network device rejects the current access. In the following description, an example in which the access network element A needs to comply with the decision of the core network element and an example in which the access network element A makes the decision based on the current situation of the access network element A and the content in the first message are used for description.

In a first implementation, the access network element A determines, based only on the content in the first message, whether the second message needs to be sent to the terminal device 1. To be specific, if the core network element determines that the AS SMC procedure needs to be performed, the access network element A determines that the AS SMC procedure needs to be performed.

It should be noted that the first message may have the foregoing three forms. In this case, the first message is in the second form or the third form in the foregoing three forms. To be specific, the first message needs to include the information used by the access network element A to determine whether the AS SMC procedure with the terminal device needs to be triggered.

In a possible implementation, after receiving the first message, the access network element A determines that the first message includes the key used to perform the AS SMC procedure, the root key KgNB, or the key identifier, to indicate that the core network element determines that the AS SMC procedure needs to be performed. In this case, the access network element A determines that the AS SMC procedure needs to be performed.

In another possible implementation, after receiving the first message, the access network element A determines that the first message includes the indication information used to indicate whether the AS SMC procedure needs to be triggered, and the access network element A determines, based on content of the indication information, whether the AS SMC procedure needs to be performed. For example, the indication information is 1 bit, and the access network element A may agree, with the core network element, on that when the indication information is 0, it indicates that the AS SMC procedure does not need to be performed, and when the indication information is 1, it indicates that the AS SMC procedure needs to be performed. In this way, when the indication information is 1, it indicates that the core network element determines that the AS SMC procedure needs to be performed, and the access network element A determines that the AS SMC procedure needs to be performed.

In another possible implementation, after receiving the first message, the access network element A determines the type, of the terminal device 1, that is included in the first message, and the access network element A determines, based on the type of the terminal device 1, whether the AS SMC procedure needs to be performed. For example, the access network element A may agree, with the core network element, on that when the type of the terminal device 1 is the eMBB type, it indicates that the AS SMC procedure needs to be performed, otherwise, it indicates that the AS SMC procedure does not need to be performed. In this way, when the access network element A determines that the type, of the terminal device 1, that is included in the first message is the eMBB type, it indicates that the core network element determines that the AS SMC procedure needs to be performed, and the access network element A determines that the AS SMC procedure needs to be performed.

In another possible implementation, after receiving the first message, the access network element A determines that the first message includes the latency, and the access network element A determines, based on the latency, whether the AS SMC procedure needs to be performed. For example, the access network element A may agree, with the core network element, on that when the latency is less than 1 s, it indicates that the AS SMC procedure does not need to be performed, otherwise, it indicates that the AS SMC procedure needs to be performed. In this way, when the access network element A determines that the latency in the first message is 1.5 s, it indicates that the core network element determines that the AS SMC procedure needs to be performed, and the access network element A determines that the AS SMC procedure needs to be performed.

In another possible implementation, after receiving the first message, the access network element A determines that the first message includes the deployment environment of the access network element currently accessed by the terminal device 1, and the access network element A determines, based on the deployment environment, whether the AS SMC procedure needs to be performed. For example, the access network element A may agree, with the core network element, on that when the deployment environment is the desert environment, it indicates that the AS SMC procedure does not need to be performed, otherwise, it indicates that the AS SMC procedure needs to be performed. In this way, when the access network element A determines that the deployment environment in the first message is a business area, it indicates that the core network element determines that the AS SMC procedure needs to be performed, and the access network element A determines that the AS SMC procedure needs to be performed.

For simplification of calculation complexity of the access network element A, the core network element may predefine, with the access network element A, the information to be used for indication. In this way, after receiving the first message, the access network element A directly extracts the corresponding information from the first message such that the access network element A does not need to determine, in the first message, a type of the information sent by the core network element.

Because the core network element can usually obtain more information that is about the terminal device 1 and that is more comprehensive, the core network element can determine whether the AS SMC procedure is needed from a multi-aspect and full-dimension perspective. This ensures accuracy of the determining result. Further, the core network element notifies the access network element A of the determining result using a UE status, the determining result, or the indication information such that the access network element A can directly comply with the determining result of the core network element. This makes the decision of the access network element A simpler, more convenient, and more intuitive.

It should be noted that if the first message includes a plurality of types of information in the foregoing seven types of information, for example, the first message includes the type of the terminal device 1 and the latency required by the service needing to be performed by the terminal device 1, the access network element A may determine, based on a preset priority sequence, a type of information to be used to determine whether the AS SMC procedure needs to be performed. For example, the preset priority sequence may be A priority of the type of the terminal device 1 is higher than a priority of the latency required by the service needing to be performed by the terminal device 1. In this case, the access network element A performs determining using only the type of the terminal device 1. Certainly, another manner may alternatively be used for determining. This is not limited in the embodiments of this application.

In a second implementation, the access network element A determines, based on the content in the first message and the preset policy, whether the second message needs to be sent to the terminal device 1.

In the embodiments of this application, the preset policy may be a policy provided by an operator, or may be a policy obtained by the access network element A from the core network element, or may be locally configured by the access network element A based on specific information. The preset policy may be static. To be specific, after the access network element A configures the preset policy for the first time, the preset policy does not change, and the preset policy is used for each time of subsequent determining. The preset policy may alternatively be dynamic. To be specific, the preset policy may change. For example, a policy used when the access network element A determines, for the first time, whether the AS SMC procedure needs to be performed is different from a policy used for the second time. In a possible example, the preset policy is obtained by the access network element A from the core network element before each time of determining, and the policy sent by the core network element to the access network element A may change as a network status changes.

In a possible implementation, when the first message is in the first form in the foregoing three forms, to be specific, the first message is the initial security context setup request message shown in FIG. 1, after obtaining the first message, the access network element A determines, based on the content in the first message and the preset policy, whether the AS SMC procedure needs to be performed.

For example, the preset policy is that when the type of the terminal device is the eMBB type, the AS SMC procedure needs to be performed, otherwise, the AS SMC procedure does not need to be performed. After receiving the first message, the access network element A determines the type of the terminal device 1 by obtaining information related to the terminal device 1, for example, information, about the terminal device 1, that is obtained from the PCF entity or carried in the first message. For example, the type of the terminal device 1 is the eMBB type. The access network element A determines that the determining result determined according to the preset policy is that the AS SMC procedure needs to be performed.

The preset policy may be other content. For details, refer to content in the plurality of possible implementations in the first manner in step 308. Details are not described herein again.

In another possible implementation, the first message is in the second form or the third form in the foregoing three forms, and a manner in which the access network element A determines, according to the preset policy and based on the first message, whether to perform the AS SMC procedure may be If a determining result determined according to the preset policy is the same as the determining result indicated in the first message, the access network element A determines that the AS SMC procedure needs to be performed, otherwise, the access network element A determines that the AS SMC procedure is not to be performed. For example, the preset policy is that when the type of the terminal device is the eMBB type, the AS SMC procedure needs to be performed, otherwise, the AS SMC procedure does not need to be performed. The core network element indicates, using the indication information, that the determining result of the core network element is that the AS SMC procedure needs to be performed. In this way, after receiving the first message, the access network element A determines the type of the terminal device 1 by obtaining information related to the terminal device 1, for example, information, about the terminal device 1, that is obtained from the PCF entity or carried in the first message. For example, the type of the terminal device 1 is the eMBB type. The access network element A determines that the determining result determined according to the preset policy is that the AS SMC procedure needs to be performed. Because the determining result indicated by the first message is that the AS SMC procedure needs to be performed, the access network element A finally determines that the AS SMC procedure needs to be performed.

In this case, priorities may also be set for the determining result determined according to the preset policy and based on the determining result indicated in the first message, and the access network element A determines, based on information with a high priority, whether the AS SMC procedure needs to be performed. In this way, the access network element A may determine, based on an actual situation, a manner for determining whether the AS SMC procedure needs to be performed.

In the foregoing manner, the access network element A may determine, according to the preset policy, whether the AS SMC procedure needs to be performed. This improves flexibility of the access network element A.

Step 309: If the second message needs to be sent to the terminal device 1, the access network element A sends the second message to the terminal device 1, and the terminal device 1 receives the second message.

In this embodiment of this application, if the core network element prestores the plurality of sets of keys corresponding to the terminal device 1, and the first message received by the access network element A carries the key identifier, the second message may carry the key identifier. Alternatively, the first message received by the access network element A does not carry the key identifier. After determining, based on the first message, the key used to perform the AS SMC procedure, the access network element A may generate a key identifier, and include the key identifier in the second message. Certainly, the second message may further include other content. This is not limited herein.

It should be noted that if the access network element A determines that the AS SMC procedure does not need to be performed, but the access network element A can determine, based on the first message, the root key or the key used to perform the AS SMC procedure with the terminal device 1, the access network element A may store the key, and use the key when the AS SMC procedure needs to be performed with the terminal device 1 subsequently. For example, when the access network element A needs to send an RRC message that needs to be protected to the terminal device 1, the access network element A may directly protect the RRC message using the stored key or a derived key. When the access network element A does not use the key within a period of time, or determines, according to the preset policy, not to use the key any more, or when the terminal device 1 changes to an idle state, the access network element A may alternatively delete the key. In addition, the access network element A may store only a part of information about the UE. For example, if a location of the UE does not change, the access network element A may store information about the UE other than location information. For this UE, the access network element A may always store a key corresponding to the UE. Certainly, if the access network element A determines that the AS SMC procedure does not need to be performed, the access network element A may directly discard the key. The access network element A may perform processing based on an actual situation. This is not limited herein.

Step 310: The terminal device 1 sends a fifth message to the access network element A, and the access network element A receives the fifth message.

After receiving the fifth message, the access network element A activates AS security based on the fifth message, to complete the AS SMC procedure. Step 310 is the same as a corresponding step in FIG. 1. Details are not described herein again.

It should be noted that the technical solutions described in the embodiments of this application are described using step 301 to step 310 as an example. In a possible implementation, the technical solutions in the embodiments of this application may further include another step. For example, another step may be further added between step 306 and step 302. This is not limited herein.

In the foregoing embodiment, after the terminal device sends the fourth message to the core network element, the access network element may trigger the activation procedure of the security protection function with the terminal device. In a possible case, before the terminal device sends the fourth message to the core network element, the access network element has some important content that needs to be sent to the terminal device or needs to be negotiated with the terminal device. Security protection needs to be performed on the important content, but the terminal device does not know a requirement of the access network element. In this case, the access network element may actively trigger the activation procedure of the security protection function with the terminal device. The following describes an information sending method used in this case.

Figure 4:
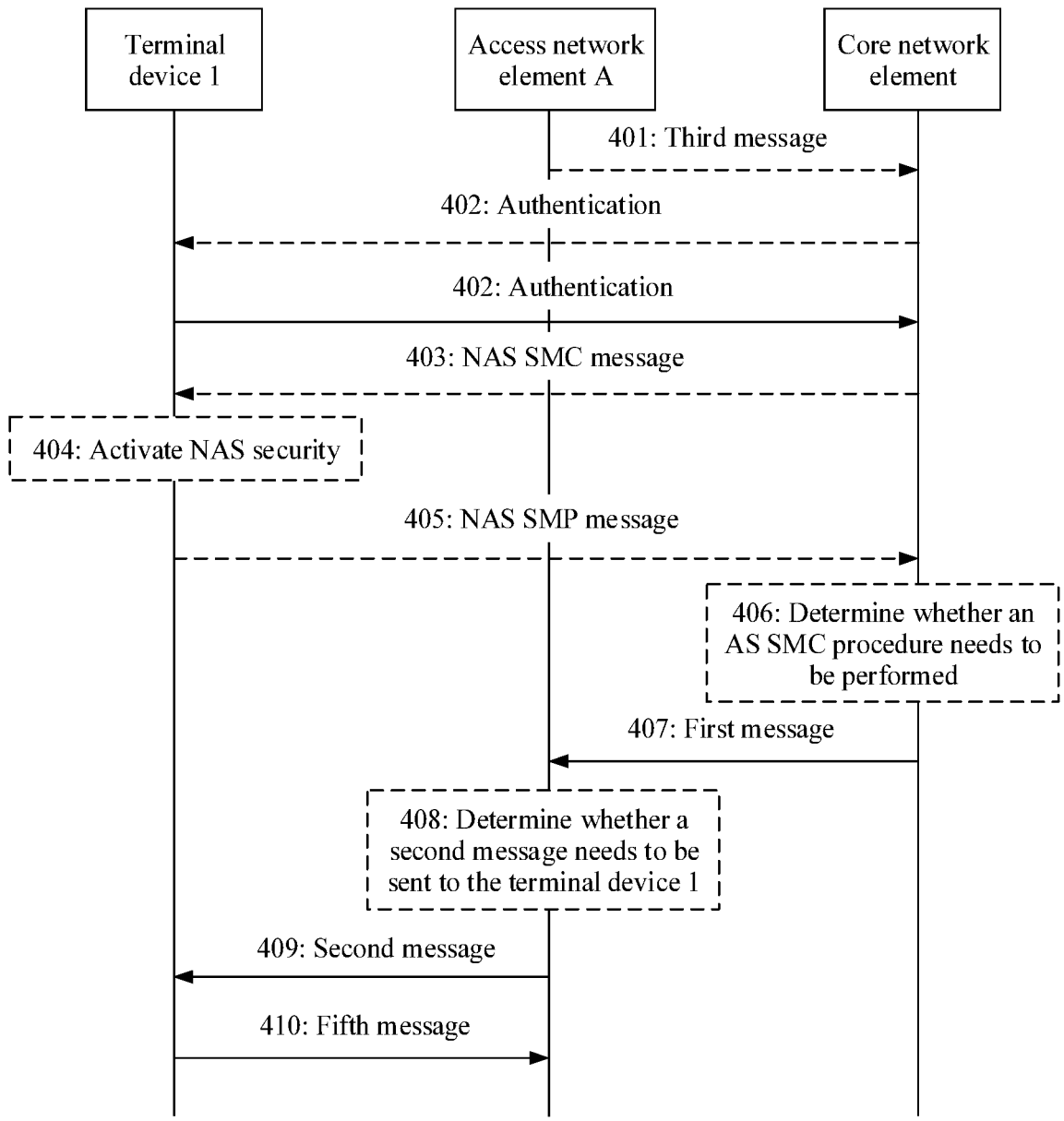
FIG. 4 is a flowchart of another information sending method according to an embodiment of this application.

FIG. 4 is a flowchart of another information sending method according to an embodiment of this application. The flowchart is described as follows.

Step 401: An access network element sends a third message to a core network element, and the core network element receives the third message.

In this embodiment of this application, descriptions of the access network element and the core network element are the same as those in the embodiments shown in FIG. 3A to FIG. 3C. Details are not described herein again. In the following description, the core network element and the access network element A are used as examples for description.

In this embodiment of this application, the third message is used to request a parameter for triggering a key activation procedure. The key activation procedure is the same as the key activation procedure in the embodiments shown in FIG. 3A to FIG. 4. Details are not described herein again. In the following description, an example in which the key activation procedure is an AS SMC procedure is used. In this case, the parameter of the key activation procedure is a parameter for performing the AS SMC procedure. To be specific, the access network element A may actively request the first message from the core network element when the access network element A needs to trigger the AS SMC procedure but does not have the necessary parameter (for example, a key). For example, the access network element A needs to exchange RRC signaling with a terminal device 1, and the RRC signaling can be sent only when the RRC signaling is protected. However, the access network element does not receive the first message sent by the core network element, or the access network element A does not store a root key KgNB used to perform the AS SMC procedure with the terminal device. In this case, the access network element A actively sends the third message to the core network element.

In the foregoing manner, the access network element A may send, to the terminal device 1 at any time, a message that needs security protection. This improves flexibility of security verification.

It should be noted that, after the access network element A performs the AS SMC procedure with the terminal device 1 once, the access network element A may store the root key KgNB used to perform the AS SMC procedure with the terminal device 1, for example, store the root key KgNB using an inactive procedure. In this way, when the terminal device 1 changes from an idle state to a connected stated in which the terminal device 1 is connected to the access network element A, the access network element A may trigger the AS SMC procedure again based on the stored root key KgNB. Alternatively, after the access network element A performs the AS SMC procedure with the terminal device 1 once, when the terminal device 1 changes from the connected state to the idle state, the access network element A may delete the root key KgNB used to perform the AS SMC procedure with the terminal device 1. In this way, when the terminal device 1 changes to the connected state again, the access network element A needs to obtain the KgNB again. In this case, the access network element A may actively send the third message to the core network element to request the KgNB. Optionally, the request may be sent to the core network element together with another message such as a fourth message or another N2 message, or may be separately sent to the core network element.

In addition, it should be noted that there may be a plurality of terminal devices connected to the access network element A, for example, including the terminal device 1, a terminal device 2, and a terminal device 3. If different UEs correspond to different keys that are in the core network element and are used to perform the AS SMC procedure, the third message sent by the access network element A to the core network element may further carry identification information of the terminal device 1, for example, a subscription permanent identifier (SUPI) of the terminal device 1, a globally unique temporary UE identity (GUTI), or an index number provided by the core network element. In this way, after receiving the third message, the core network element notifies the access network element A of the key that corresponds to the terminal device 1 and that is used to perform the AS SMC procedure.

It should be noted that step 401 is an optional step, that is, is not mandatory. To be specific, if the access network element A stores the parameter used to trigger the AS SMC procedure with the terminal device 1, for example, the key used to perform the AS SMC procedure or the root key KgNB, step 401 may not be performed. Alternatively, the access network element A may obtain, in another manner, the parameter used to trigger the AS SMC procedure with the terminal device 1. This is not limited herein.

Step 402: The core network element and the terminal device 1 perform authentication on each other.

Step 403: The core network element sends a NAS SMC message to the terminal device 1, and the terminal device 1 receives the NAS SMC message.

Step 404: The terminal device 1 activates NAS security based on the NAS SMC message.

Step 405: The terminal device 1 sends a NAS SMP message to the core network element, and the core network element receives the NAS SMP message and activates NAS security.

Step 402 to step 405 are the same as step 303 to step 306. Details are not described herein again. Step 402 to step 405 are optional steps and are not mandatory. To be specific, after receiving the third message sent by the access network element A, the core network element may perform step 402 to step 405 to perform an authentication and NAS security verification process, or may not perform the verification process in step 402 to step 405. This is not limited herein.

Step 406: The core network element determines whether the terminal device 1 needs to perform an AS SMC procedure.

After receiving the third message, the core network element may determine whether the terminal device 1 needs to perform the AS SMC procedure. In this embodiment of this application, the core network element may determine a type of the terminal device 1, and determine, based on the type of the terminal device 1, whether the AS SMC procedure needs to be performed. Alternatively, the core network element may determine, based on QoS information obtained from another core network element only after the third message is received, whether the AS SMC procedure needs to be performed. Alternatively, the core network element may obtain, from the core network element or another network element, status information of the access network element currently accessed by the terminal device 1, to determine whether the AS SMC procedure needs to be performed. Alternatively, the core network element may determine, using a configured policy or a policy provided by a network management system, whether the AS SMC procedure needs to be performed. Alternatively, after receiving the third message, the core network element may determine, based on indication information carried in the third message, whether the AS SMC procedure needs to be performed. The indication information may be from the access network element A. Step 406 is the same as step 302, and details are not described herein again.

It should be noted that step 406 is an optional step, that is, is not mandatory.

In addition, it should be noted that an execution sequence of step 406 and step 402 to step 405, a quantity of execution times of step 406, and an indication occasion of a determining result in step 406 are the same as those in step 302 and step 303 to step 306. Details are not described herein again.

Step 407: The core network element sends a first message to the access network element A, and the access network element A receives the first message.

Step 408: The access network element A determines, based on the first message, whether a second message needs to be sent to the terminal device 1.

Step 409: If the second message needs to be sent to the terminal device 1, the access network element A sends the second message to the terminal device 1, and the terminal device 1 receives the second message.

Step 410: The terminal device 1 sends a fifth message to the access network element A, and the access network element A receives the fifth message.

Step 407 to step 410 are the same as step 307 to step 310. Details are not described herein again.

It should be noted that the technical solutions described in the embodiments of this application are described using step 401 to step 410 as an example. In a possible implementation, the technical solutions in the embodiments of this application may further include another step. This is not limited herein.

In the foregoing technical solutions, the core network element or the access network element may first determine, based on an actual situation, whether the activation procedure of the security protection function needs to be performed, and trigger the activation procedure of the security protection function with the terminal device only when the activation procedure of the security protection function needs to be performed, or directly skip performing the activation procedure if the activation procedure of the security protection function does not need to be performed. In this way, a signaling resource waste and a latency caused when only the activation procedure is performed in a 4G system can be avoided. Further, a manner of performing determining before the activation procedure is performed is used such that different processing manners may be used in a system for different system requirements. This improves system flexibility.

In the embodiments shown in FIG. 3A to FIG. 4, a process in which the core network element generates the key for performing the activation procedure of the security protection function, and indicates the key to the access network element is described. Because the activation procedure is performed between the access network element and the terminal device, in another manner, the access network element may alternatively generate the key, to simplify calculation complexity of the core network element.

Figure 5:
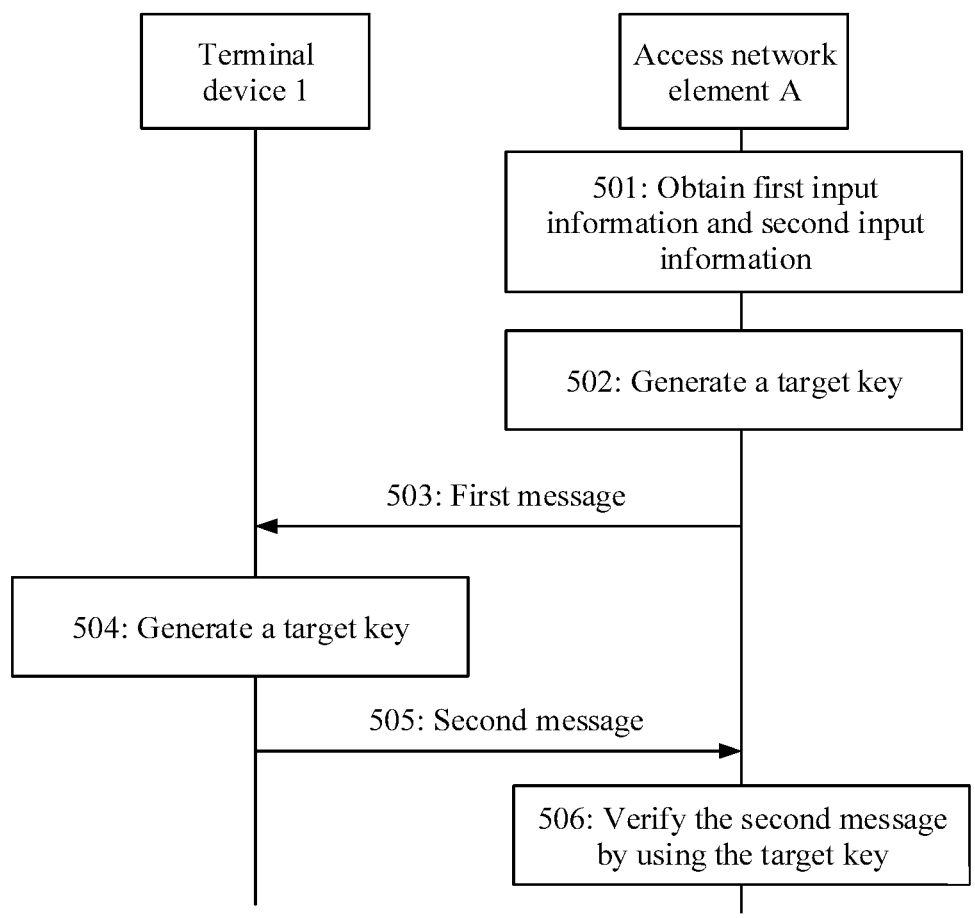
FIG. 5 is a flowchart of a key generation method according to an embodiment of this application.
Figure 6:
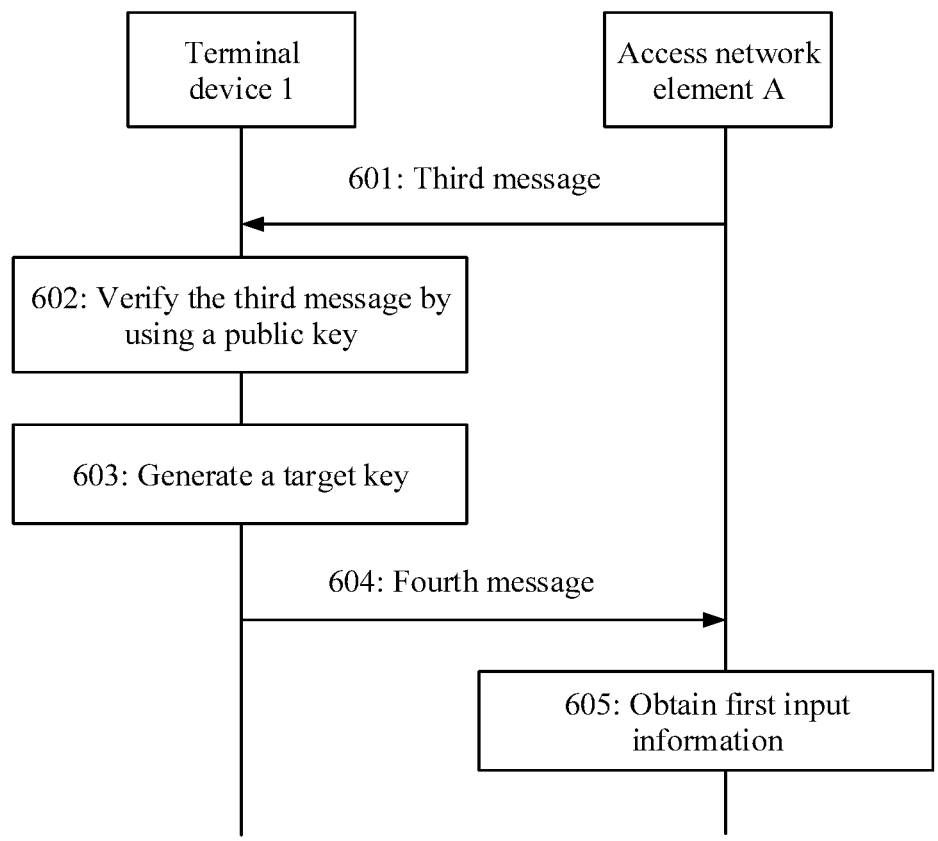
FIG. 6 is a flowchart of an implementation in which an access network element A obtains first input information according to an embodiment of this application.
Figure 7:
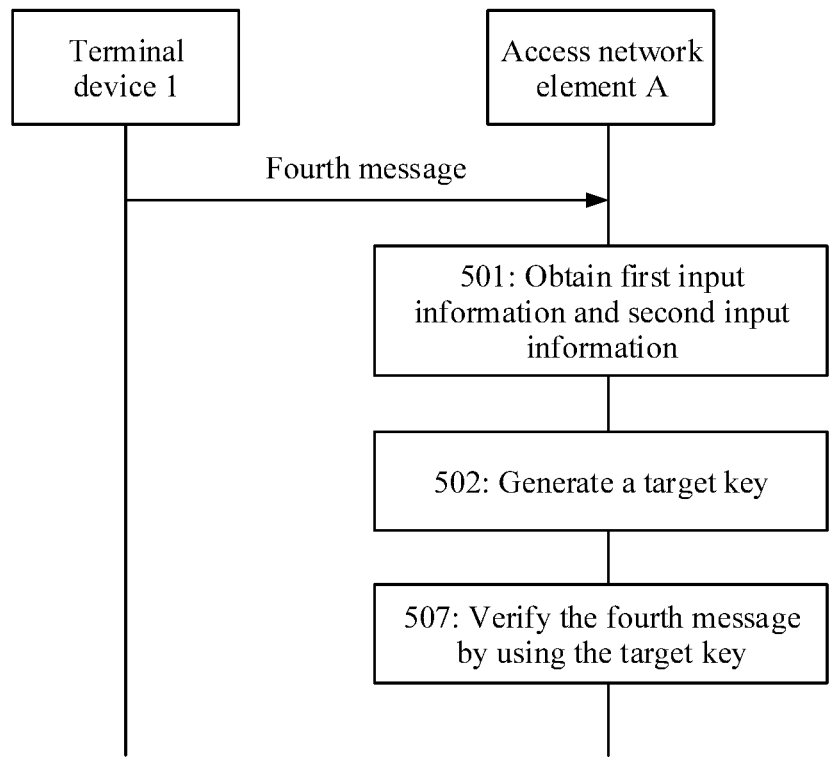
FIG. 7 is a flowchart of another key generation method according to an embodiment of this application.

FIG. 5 to FIG. 7 are a flowchart of a key generation method according to an embodiment of this application. An example in which the method is applied to the system shown in FIG. 2 is used. The flowchart is described as follows.

Step 501: An access network element obtains first input information and second input information.

In this embodiment of this application, the first input information is information used by a terminal device to generate a target key, the target key is a key used to perform a key activation procedure, and the key activation procedure is the same as the key activation procedure in the embodiments shown in FIG. 3A to FIG. 4. Details are not described herein again. An example in which the security verification is an AS SMC procedure is used below. The key of the key activation procedure is a key of the AS SMC procedure. The second input information is information used by the access network element to generate the target key.

Because an application scenario of the key generation method in FIG. 5 is the same as that of the embodiments in FIG. 3A to FIG. 4, for ease of description, an example in which the access network element is the access network element A and the terminal device is the terminal device 1 is still used in the following description.

In this embodiment of this application, the key for performing the AS SMC procedure is the same as the key for performing the AS SMC procedure in the embodiments shown in FIG. 3A to FIG. 4. Details are not described herein again.

In a possible implementation, the first input information may be a generation material, for example, a random number 1, used by the terminal device 1 to generate the key. The second input information may be a generation material, for example, a random number 2, used by the access network element A to generate the key. Certainly, the first input information and the second input information may alternatively be other content. This is not limited herein.

In this embodiment of this application, the access network element A may obtain the first input information and the second input information in a plurality of manners. The following separately describes manners in which the access network element A obtains the first input information and manners in which the access network element A obtains the second input information.

(a) Manners in which the Access Network Element a Obtains the Second Input Information:

In a first manner, the access network element A obtains the second input information from a core network element.

In a possible implementation, the access network element A may request the second input information from the core network element. If the core network element stores the second input information, the core network element sends the second input information to the access network element A.

In another possible implementation, after the access network element A requests the second input information from the core network element, the core network element may send, to the access network element A, a material and/or an algorithm used to generate the second input information, and then the access network element A generates the second input information based on the material and/or the algorithm used to generate the second input information. For example, the material used to generate the second input information is security capability information of the terminal device 1, and the security capability information may include an encryption rule supported by the terminal device 1, an integrity protection rule, capability level information of the terminal device 1, and the like. Content included in the security capability information is not limited in this embodiment of this application. When the terminal device 1 sends a registration request message or a service request message to the core network element, the security capability information of the terminal device 1 is included in the request message, and the core network element obtains the security capability information of the terminal device 1 from the request message. When the access network element A requests the second input information from the core network element, the core network element sends the security capability information of the terminal device 1 to the access network element A, and the access network element A generates the second input information based on the security capability information.

In a second manner, the access network element A obtains the second input information based on information stored in the access network element A.

In a possible implementation, the access network element A may obtain the second input information based on preset information. For example, the access network element stores a plurality of available keys, and each key corresponds to one piece of identification information, for example, an index number. The access network element A generates a random number to generate an intermediate parameter, or the access network element A generates an intermediate parameter using a symmetric key mechanism, and performs calculation using the intermediate parameter, to obtain an index number of the target key in order to obtain the target key.

In a third manner, the access network element A obtains the second input information based on information included in RRC signaling between the access network element A and the terminal device 1.

In a possible implementation, the access network element A first receives first RRC signaling sent by the terminal device 1, where the first RRC signaling may be bearer signaling used by the terminal device 1 to send the registration request message or the service request message to the core network element, and the terminal device 1 includes the security capability information of the terminal device 1 in the RRC signaling. Further, the request message includes two layers. The first layer is an RRC layer, the second layer is a NAS layer, and the NAS layer is higher than the RRC layer. Both the RRC layer and the NAS layer in the request message may carry the security capability information. Because the request message needs to be forwarded by the access network element A to the core network element, the access network element A obtains the request message sent by the terminal device 1 to the core network element, and obtains RRC layer data, namely, the first RRC signaling, from the request message. Then, the access network element A obtains the security capability information of the terminal device 1 from the first RRC signaling, and generates the second input information based on the security capability information of the terminal device 1. Certainly, the first RRC signaling may alternatively be other RRC signaling independent of the registration request message or the service request message sent to the core network element. For example, the access network element A may send, to the terminal device 1, RRC signaling for requesting the security capability information, and then the terminal device 1 feeds back the security capability information to the access network element A using the first RRC signaling, where the first RRC signaling is signaling specially used to carry the security capability information of the terminal device 1. Certainly, the first RRC signaling may alternatively be in another form. This is not limited herein.

In the foregoing manner, the access network element A may no longer need to request the security capability information of the terminal device 1 from the core network element. This can reduce signaling overheads.

(b) Manners in which the Access Network Element a Obtains the First Input Information:

In a first manner, the access network element A obtains the first input information from the core network element.

In a possible implementation, the access network element A may request the first input information from the core network element. If the core network element stores the first input information of the terminal device 1, the core network element sends the first input information to the access network element A. If the core network element does not store the first input information of the terminal device 1, the core network element may obtain the first input information by interacting with the terminal device 1, and then send the first input information to the access network element A. For example, the terminal device 1 may send a registration request message or a service request message to the core network element, and include the first input information of the terminal device 1 in the registration request message or the service request message, and the core network element obtains the first input information from the registration request message or the service request message, and sends the first input information to the access network element A.

In another possible implementation, the core network element sends the first input information to the access network element A. For example, the first input information is carried in NAS signaling such as a registration request or a session request, the core network element obtains the first input information from the NAS signaling, and then the core network element sends the first input information to the access network element A.

In a second manner, the access network element A obtains the first input information from a storage unit of the access network element A.

In a possible implementation, the access network element A prestores the first input information of the terminal device 1. For example, the terminal device 1 exchanges data with the access network element A before a current moment, and the exchanged data is data that needs to be protected. Then, the terminal device 1 changes from a connected state to a third state, for example, an inactive state. In this case, if the access network element A intends to exchange data with the terminal device 1 again, and the access network element A further stores the first input information of the terminal device 1, the access network element A directly obtains the first input information from the storage unit of the access network element A.

In a third manner, the access network element A obtains the first input information through RRC signaling.

In a possible implementation, the access network element A first receives second RRC signaling sent by the terminal device 1, where the second RRC signaling may be signaling used by the terminal device 1 to carry a registration request message or a service request message sent to the core network element. The terminal device 1 includes the first input information of the terminal device 1 in the request message. In this case, the second RRC signaling and the first RRC signaling are the same RRC signaling, in other words, the first RRC signaling or the second RRC signaling carries both the security capability information and the first input information of the terminal device 1. Then, the access network element A obtains the first input information from the RRC signaling.

Certainly, the second RRC signaling may alternatively be RRC signaling different from the first RRC signaling. For example, the access network element A may obtain the first input information from the AS SMP message. Alternatively, the access network element A sends, to the terminal device 1, RRC signaling for requesting the first input information, and then the terminal device 1 feeds back the first input information to the access network element A through the second RRC signaling, where the second RRC signaling is signaling specially used to carry the first input information. Certainly, the second RRC signaling may alternatively be in another form. This is not limited herein.

In a fourth manner, the access network element A obtains the first input information using a preset procedure.

In a possible implementation, referring to FIG. 6, a method for obtaining the first input information by the access network element A includes the following steps.

Step 601: The access network element A sends a third message to the terminal device 1, and the terminal device 1 receives the third message.

In this embodiment of this application, the third message is a message signed using a public key, and the public key is preconfigured in the access network element A. The third message may be a message used to perform an AS SMC procedure, for example, an AS SMC message.

It should be noted that the public key may alternatively be replaced with a certificate, or other information used to perform integrity protection on the message. This is not limited herein.

Step 602: The terminal device 1 verifies a signature of the third message using the public key.

The public key may be preconfigured in the terminal device 1, or may be obtained by the terminal device 1 from the access network element A in advance, or may be obtained in another manner. This is not limited herein. After receiving the third message, the terminal device 1 verifies the signature of the third message using the public key. A specific verification process is the same as a verification process in the other approaches. Details are not described herein.

Step 603: If the signature of the third message is correct, the terminal device 1 generates the target key based on a parameter and the first input information in the third message.

In this case, the target key is a key activated in the AS SMC procedure. To be specific, after completing the AS SMC procedure, the terminal device 1 starts to protect a subsequent message using the target key. A manner in which the terminal device 1 generates the target key is as follows.

In a first case, the third message includes the second input information used by the access network element A to generate the target key, and the terminal device 1 generates the target key based on the second input information and the first input information. For example, the terminal device 1 pre-stores a plurality of algorithms for generating the target key. The terminal device 1 selects an algorithm from the plurality of algorithms, and performs an operation on the first input information and the second input information, to obtain the target key.

In a second case, the third message includes the second input information and an algorithm used to generate the target key, and the terminal device 1 generates the target key according to the algorithm and based on the first input information and the second input information.

Step 604: The terminal device 1 sends a fourth message to the access network element A, and the access network element A receives the fourth message.

In this embodiment of this application, integrity protection processing is performed on the fourth message using the target key, and the fourth message includes the first input information.

In a possible implementation, if the third message is a message used to perform the AS SMC procedure, the fourth message may be a message used to provide a feedback on the third message, for example, may be an AS SMP message.

It should be noted that when the third message is a message used to perform the AS SMC procedure, before performing step 604, the terminal device 1 may activate AS security based on the third message. A specific process of activating AS security is the same as that in the other approaches. Details are not described herein.

Step 605: The access network element A obtains the first input information from the fourth message.

It should be noted that the access network element A may obtain the second input information in any one of the plurality of manners in (a), and may obtain the first input information in any one of the plurality of manners in (b), that is, the manners in (a) and (b) may be combined randomly. For example, the second input information is obtained in the first manner in (a) and the first input information is obtained in the second manner in (b), or the second input information is obtained in the third manner in (a) and the first input information is obtained in the first manner in (b). This is not limited herein.

In addition, it should be noted that a sequence of obtaining the first input information and obtaining the second input information by the access network element A is not limited in this embodiment of this application. To be specific, the access network element A may first obtain the first input information and then obtain the second input information, or may first obtain the second input information and then obtain the first input information, or obtain the first input information and the second input information at the same time. Certainly, if the first input information needs to be obtained using the second input information, for example, in the first two cases in step 603, the access network element A needs to first obtain the second input information, and then obtain the first input information.

Step 502: The access network element A generates the target key based on the first input information and the second input information.

Step 502 is the same as step 603. Details are not described herein again.

When the access network element A obtains the first input information in one of the first three manners in (b), referring to FIG. 5, the method in this embodiment of this application may further include the following steps.

Step 503: The access network element A sends a first message to the terminal device 1.

In this embodiment of this application, integrity protection is performed on the first message using the target key, and/or the first message is encrypted using the target key. A form and included content of the first message are the same as those of the third message in step 601, and step 503 is the same as step 601. Details are not described herein again.

Step 504: The terminal device 1 generates the target key based on the first message and the first input information.

In a possible implementation, integrity protection is performed on the first message using the public key, and the terminal device 1 verifies the signature of the first message using the public key. In this case, step 504 is the same as step 602. Details are not described herein again. After the verification succeeds, the target key is generated using the second input information and the first input information that are in the first message.

In a possible implementation, the first message is encrypted using the public key, and the terminal device 1 decrypts the first message using the public key, and if the decryption succeeds, the terminal device 1 generates the target key using the second input information and the first input information that are in the first message.

Step 505: The terminal device 1 sends a second message to the access network element A, and the access network element A receives the second message.

In this embodiment of this application, integrity protection processing is performed on the second message using the target key. The second message is the same as the fourth message in step 604. Details are not described herein again.

Step 506: The access network element A verifies the second message using the target key, and completes the AS SMC procedure when the verification succeeds.

Because the integrity protection processing is performed on the second message using the target key, and the access network element A can only obtain information in the second message but cannot change the second message, if the access network element A successfully verifies the integrity protection processing on the second message using the target key generated by the access network element A, it indicates that the verification succeeds, and further the AS SMC procedure is completed.

Certainly, if a third party application tampers with the first input information sent by the terminal device 1, for example, changes the first input information in the first RRC signaling into third input information, the access network element A obtains the third input information. In this case, a key generated by the access network element A based on the third input information and the second input information is definitely different from the key generated by the terminal device 1 based on the first input information and the second input information. Consequently, after receiving the second message, the access network element A cannot verify the integrity protection processing on the second message. That is, it indicates that the verification fails, and AS security cannot be activated.

It should be noted that, in this embodiment of this application, the first input information is information actually received by the access network element A, and the first input information may be the same as input information actually used by the terminal device 1 to generate the target key, or may be different from input information actually used by the terminal device 1 to generate the target key.

When the access network element A obtains the first input information in the fourth manner in (b), referring to FIG. 7, the method in this embodiment of this application may further include the following steps.

Step 507: The access network element A verifies the fourth message using the target key, and completes the AS SMC procedure when the verification succeeds.

A process in which the access network element A verifies the fourth message using the target key is the same as the process in which the access network element A verifies the second message using the target key in step 506. Details are not described herein again.

It should be noted that the technical solutions described in the embodiments of this application are described using step 501 to step 507 as an example. In a possible implementation, the technical solutions in the embodiments of this application may further include another step. This is not limited herein.

In the foregoing technical solution, the access network element may directly generate, based on the first input information and the second input information, the key used to perform the key activation procedure. In this way, activation of the security protection function of the access network element may be determined by the access network element, without depending on the core network element such that security negotiation between the access network element and the terminal device can be more flexible.

In the foregoing embodiments provided in this application, the methods provided in the embodiments of this application are separately described from perspectives of the network device, the terminal device, and interaction between the network device and the terminal device. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a function of the functions is performed using the hardware structure, the software module, or the combination of the hardware structure and the software module depends on a specific application and a design constraint condition of the technical solutions.

Figure 8:
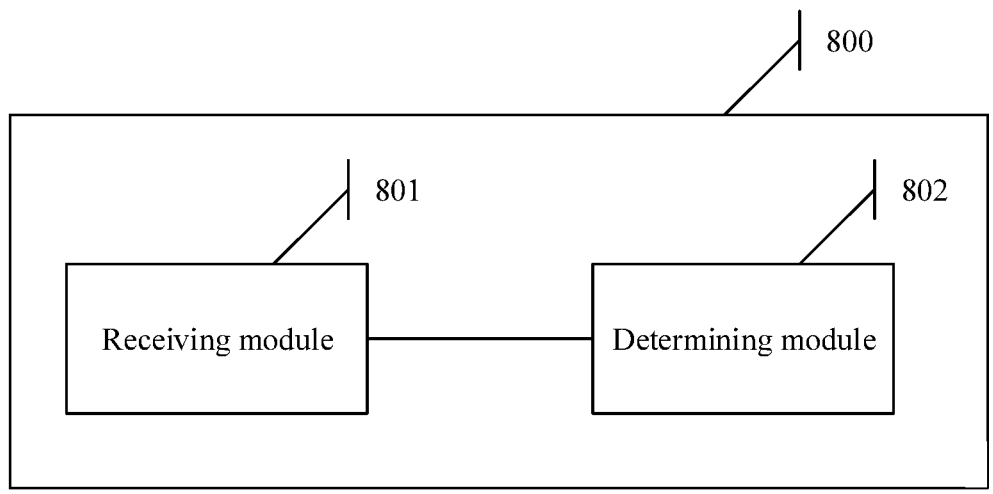
FIG. 8 is a schematic structural diagram of an apparatus according to an embodiment of this application.

FIG. 8 is a schematic structural diagram of an apparatus 800. The apparatus 800 may be an access network element, and can implement a function of the access network element in the methods provided in the embodiments of this application. Alternatively, the apparatus 800 may be an apparatus that can support an access network element in implementing a function of the access network element in the methods provided in the embodiments of this application. The apparatus 800 may be a hardware structure, a software module, or a combination of a hardware structure and a software module. The apparatus 800 may be implemented by a chip system. In this embodiment of this application, the chip system may include a chip, or may include a chip and another discrete component.

The apparatus 800 may include a receiving module 801 and a determining module 802.

The receiving module 801 may be configured to perform step 307 in the embodiments shown in FIG. 3A to FIG. 3C, or step 407 in the embodiment shown in FIG. 4, and/or configured to support another process of the technologies described in this specification. The receiving module 801 is configured to perform communication between the apparatus 800 and another module, and may be a circuit, a component, an interface, a bus, a software module, a transceiver, or any other apparatus that can implement communication.

The determining module 802 may be configured to perform step 308 in the embodiments shown in FIG. 3A to FIG. 3C, or step 408 in the embodiment shown in FIG. 4, and/or configured to support another process of the technologies described in this specification.

All related content of the steps in the foregoing method embodiments may be cited in function descriptions of corresponding function modules. Details are not described herein again.

Figure 9:
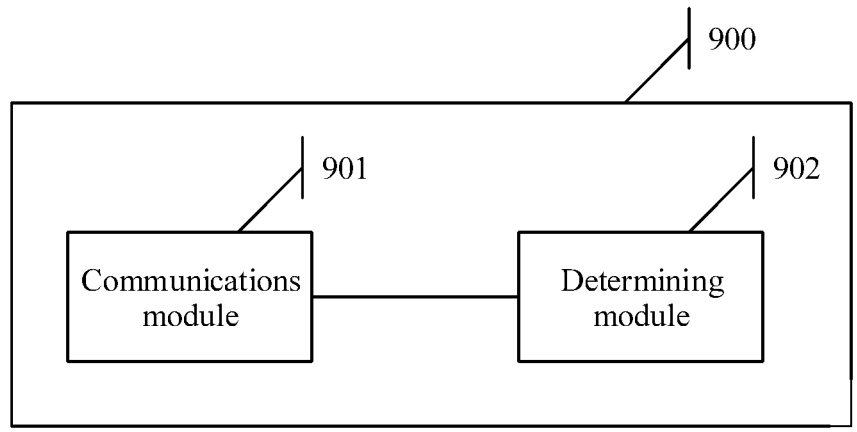
FIG. 9 is a schematic structural diagram of another apparatus according to an embodiment of this application.

FIG. 9 is a schematic structural diagram of an apparatus 900. The apparatus 900 may be a core network element, and can implement a function of the core network element in the methods provided in the embodiments of this application. Alternatively, the apparatus 900 may be an apparatus that can support a core network element in implementing a function of the core network element in the methods provided in the embodiments of this application. The apparatus 900 may be a hardware structure, a software module, or a combination of a hardware structure and a software module. The apparatus 900 may be implemented by a chip system. In this embodiment of this application, the chip system may include a chip, or may include a chip and another discrete component.

The apparatus 900 may include a communications module 901 and a determining module 902.

The communications module 901 may be configured to perform any one of steps 301, 303, 304, 306, and 307 in the embodiments shown in FIG. 3A to FIG. 3C, or any one of steps 401, 402, 403, and 407 in the embodiment shown in FIG. 4, and/or configured to support another process of the technologies described in this specification. The communications module 901 is configured to perform communication between the apparatus 900 and another module, and may be a circuit, a component, an interface, a bus, a software module, a transceiver, or any other apparatus that can implement communication.

The determining module 902 may be configured to perform step 302 in the embodiments shown in FIG. 3A to FIG. 3C, or step 406 in the embodiment shown in FIG. 4, and/or configured to support another process of the technologies described in this specification.

All related content of the steps in the foregoing method embodiments may be cited in function descriptions of corresponding function modules. Details are not described herein again.

Figure 10:
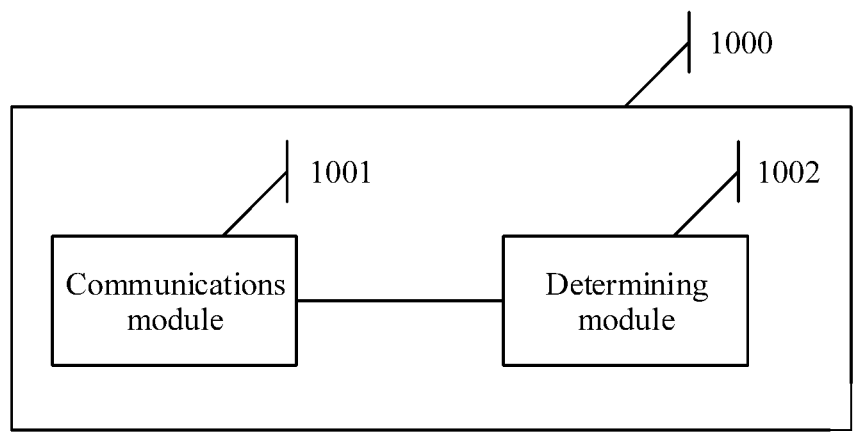
FIG. 10 is a schematic structural diagram of another apparatus according to an embodiment of this application.

FIG. 10 is a schematic structural diagram of an apparatus 1000. The apparatus 1000 may be a terminal device, and can implement a function of the terminal device in the methods provided in the embodiments of this application. Alternatively, the apparatus 1000 may be an apparatus that can support a terminal device in implementing a function of the terminal device in the methods provided in the embodiments of this application. The apparatus 1000 may be a hardware structure, a software module, or a combination of a hardware structure and a software module. The apparatus 1000 may be implemented by a chip system. In this embodiment of this application, the chip system may include a chip, or may include a chip and another discrete component.

The apparatus 1000 may include a communications module 1001 and a determining module 1002.

The communications module 1001 may be configured to perform step 505 in the embodiment shown in FIG. 5, or step 604 in the embodiment shown in FIG. 6, and/or configured to support another process of the technologies described in this specification. The communications module 1001 is configured to perform communication between the apparatus 1000 and another module, and may be a circuit, a component, an interface, a bus, a software module, a transceiver, or any other apparatus that can implement communication.

The determining module 1002 may be configured to perform step 504 in the embodiment shown in FIG. 5, or step 602 or step 603 in the embodiment shown in FIG. 6, and/or configured to support another process of the technologies described in this specification.

All related content of the steps in the foregoing method embodiments may be cited in function descriptions of corresponding function modules. Details are not described herein again.

Figure 11:
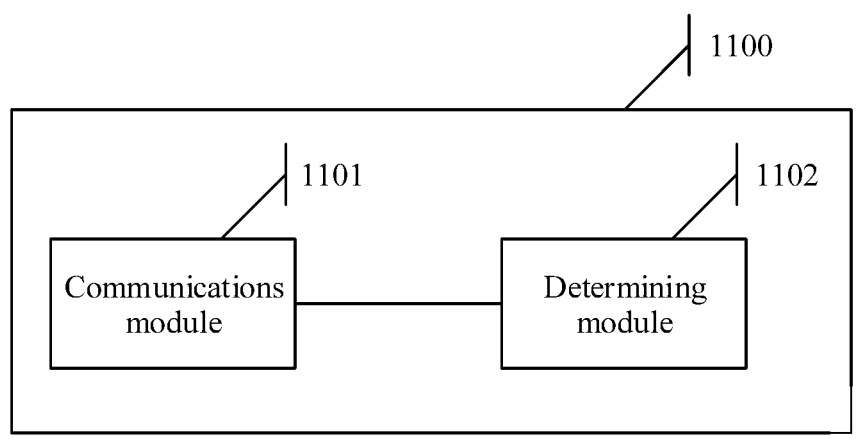
FIG. 11 is a schematic structural diagram of another apparatus according to an embodiment of this application.

FIG. 11 is a schematic structural diagram of an apparatus 1100. The apparatus 1100 may be a terminal device, and can implement a function of the access network element in the methods provided in the embodiments of this application. Alternatively, the apparatus 1100 may be an apparatus that can support an access network element in implementing a function of the access network element in the methods provided in the embodiments of this application. The apparatus 1100 may be a hardware structure, a software module, or a combination of a hardware structure and a software module. The apparatus 1100 may be implemented by a chip system. In this embodiment of this application, the chip system may include a chip, or may include a chip and another discrete component.

The apparatus 1100 may include a communications module 1101 and a determining module 1102.

The communications module 1101 may be configured to perform step 503 in the embodiment shown in FIG. 5, or step 601 in the embodiment shown in FIG. 6, and/or configured to support another process of the technologies described in this specification. The communications module 1101 is configured to perform communication between the apparatus 1000 and another module, and may be a circuit, a component, an interface, a bus, a software module, a transceiver, or any other apparatus that can implement communication.

The determining module 1102 may be configured to perform any one of step 501, step 502, and step 506 in the embodiment shown in FIG. 5, or step 605 in the embodiment shown in FIG. 6, and/or configured to support another process of the technologies described in this specification.

All related content of the steps in the foregoing method embodiments may be cited in function descriptions of corresponding function modules. Details are not described herein again.

Division into modules in the embodiments of this application is an example, is merely logical function division, and may be other division in actual implementation. In addition, function modules in the embodiments of this application may be integrated into one processor, or each of the modules may exist alone physically, or two or more modules are integrated into one module. The integrated module may be implemented in a form of hardware, or may be implemented in a form of a software function module.

Figure 12:
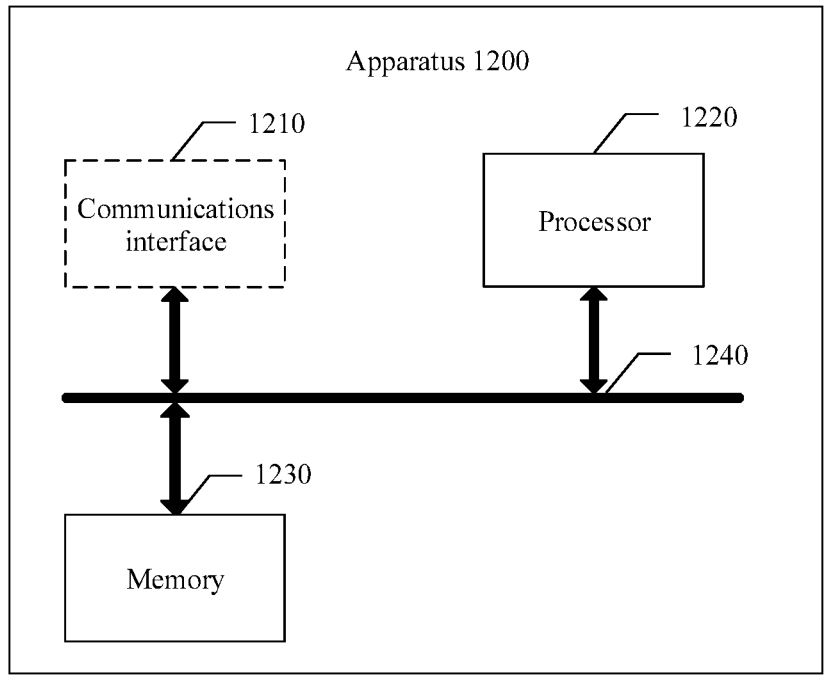
FIG. 12 is a schematic structural diagram of another apparatus according to an embodiment of this application.

FIG. 12 shows an apparatus 1200 according to an embodiment of this application. The apparatus 1200 may be the access network element in the embodiments shown in FIG. 3A to FIG. 4, and can implement a function of the access network element in the methods provided in the embodiments of this application. Alternatively, the apparatus 1200 may be an apparatus that can support an access network element in implementing a function of the access network element in the methods provided in the embodiments of this application. The apparatus 1200 may be a chip system. In this embodiment of this application, the chip system may include a chip, or may include a chip and another discrete component.

The apparatus 1200 includes at least one processor 1220 configured to implement or support the apparatus 1200 in implementing the function of the access network element in the methods provided in the embodiments of this application. For example, the processor 1220 may determine, based on a first message, whether to send, to a terminal device, a second message used to trigger the terminal device to perform a key activation procedure. For details, refer to the detailed descriptions in the method examples. Details are not described herein again.

The apparatus 1200 may further include at least one memory 1230 configured to store a program instruction and/or data. The memory 1230 is coupled to the processor 1220. Couplings in this embodiment of this application are indirect couplings or communication connections between apparatuses, units, or modules, may be electrical, mechanical, or another form, and are used for information exchange between the apparatuses, the units, and the modules. The processor 1220 may operate with the memory 1230. The processor 1220 may execute the program instruction stored in the memory 1230. At least one of the at least one memory may be included in the processor.

The apparatus 1200 may further include a communications interface 1210 configured to communicate with another device through a transmission medium such that an apparatus in the apparatus 1200 can communicate with the other device. For example, the other device may be a terminal device. The processor 1220 may send and receive data using the communications interface 1210.

A specific connection medium between the communications interface 1210, the processor 1220, and the memory 1230 is not limited in this embodiment of this application. In this embodiment of this application, in FIG. 12, the memory 1230, the processor 1220, and the communications interface 1210 are connected through a bus 1240. The bus is represented by a bold line in FIG. 12. A connection manner between other components is merely an example for description, and is not limited thereto. The bus may be classified into an address bus, a data bus, a control bus, and the like. For ease of representation, only one bold line is used to represent the bus in FIG. 12, but this does not mean that there is only one bus or only one type of bus.

In this embodiment of this application, the processor 1220 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed using a combination of hardware in the processor and a software module.

In this embodiment of this application, the memory 1230 may be a non-volatile memory, such as a hard disk drive (HDD) or a solid-state drive (SSD), or may be a volatile memory, such as a random-access memory (RAM). The memory is any other medium that can be configured to carry or store expected program code that is in a form of an instruction or a data structure and that can be accessed by a computer, but is not limited thereto. The memory in this embodiment of this application may alternatively be a circuit or any other apparatus that can implement a storage function, and is configured to store a program instruction and/or data.

Figure 13:
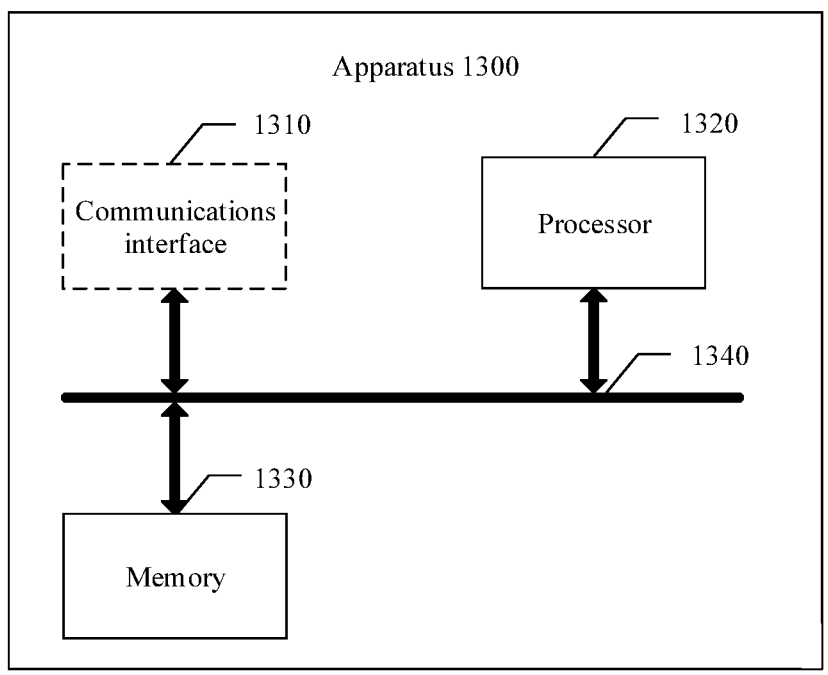
FIG. 13 is a schematic structural diagram of another apparatus according to an embodiment of this application.

FIG. 13 shows an apparatus 1300 according to an embodiment of this application. The apparatus 1300 may be a core network element, and can implement a function of the core network element in the methods provided in the embodiments of this application. Alternatively, the apparatus 1300 may be an apparatus that can support a core network element in implementing a function of the core network element in the methods provided in the embodiments of this application. The apparatus 1300 may be a chip system. In this embodiment of this application, the chip system may include a chip, or may include a chip and another discrete component.

The apparatus 1300 includes at least one processor 1320 configured to implement or support the apparatus 1300 in implementing the function of the core network element in the methods provided in the embodiments of this application. For example, the processor 1320 may determine whether a terminal device needs to perform a key activation procedure. For details, refer to detailed descriptions in the method examples. Details are not described herein again.

The apparatus 1300 may further include at least one memory 1330 configured to store a program instruction and/or data. The memory 1330 is coupled to the processor 1320. Couplings in this embodiment of this application are indirect couplings or communication connections between apparatuses, units, or modules, may be electrical, mechanical, or another form, and are used for information exchange between the apparatuses, the units, and the modules. The processor 1320 may operate with the memory 1330. The processor 1320 may execute the program instruction stored in the memory 1330. At least one of the at least one memory may be included in the processor.

The apparatus 1300 may further include a communications interface 1310 configured to communicate with another device through a transmission medium such that an apparatus in the apparatus 1300 can communicate with the other device. For example, the other device may be a terminal device. The processor 1320 may send and receive data using the communications interface 1310.

A specific connection medium between the communications interface 1310, the processor 1320, and the memory 1330 is not limited in this embodiment of this application. In this embodiment of this application, in FIG. 13, the memory 1330, the processor 1320, and the communications interface 1310 are connected through a bus 1340. The bus is represented by a bold line in FIG. 13. A connection manner between other components is merely an example for description, and is not limited thereto. The bus may be classified into an address bus, a data bus, a control bus, and the like. For ease of representation, only one bold line is used to represent the bus in FIG. 13, but this does not mean that there is only one bus or only one type of bus.

In this embodiment of this application, the processor 1320 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed using a combination of hardware in the processor and a software module.

In this embodiment of this application, the memory 1330 may be a non-volatile memory, such as an HDD or an SSD, or may be a volatile memory, such as a RAM. The memory is any other medium that can be configured to carry or store expected program code that is in a form of an instruction or a data structure and that can be accessed by a computer, but is not limited thereto. The memory in this embodiment of this application may alternatively be a circuit or any other apparatus that can implement a storage function, and is configured to store a program instruction and/or data.

Figure 14:
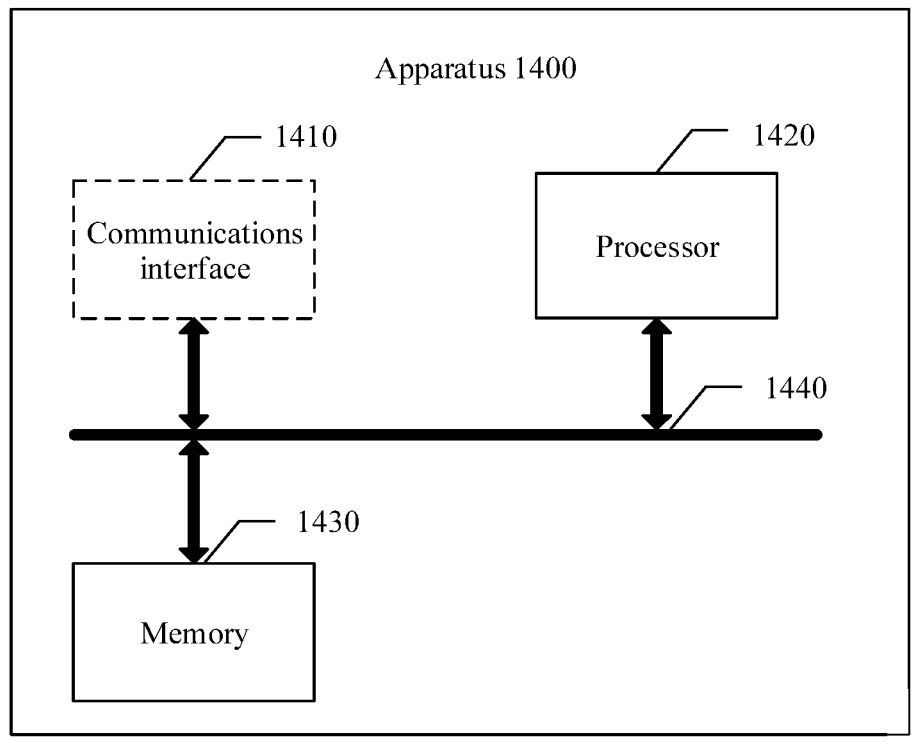
FIG. 14 is a schematic structural diagram of another apparatus according to an embodiment of this application.

FIG. 14 shows an apparatus 1400 according to an embodiment of this application. The apparatus 1400 may be the access network element in the embodiments shown in FIG. 5 to FIG. 7, and can implement a function of the access network element in the methods provided in the embodiments of this application. Alternatively, the apparatus 1400 may be an apparatus that can support an access network element in implementing a function of the access network element in the methods provided in the embodiments of this application. The apparatus 1400 may be a chip system. In this embodiment of this application, the chip system may include a chip, or may include a chip and another discrete component.

The apparatus 1400 includes at least one processor 1420 configured to implement or support the apparatus 1400 in implementing the function of the access network element in the methods provided in the embodiments of this application. For example, the processor 1420 may generate, based on first input information and second input information, a target key used to perform a key activation procedure. For details, refer to the detailed descriptions in the method examples. Details are not described herein again.

The apparatus 1400 may further include at least one memory 1430 configured to store a program instruction and/or data. The memory 1430 is coupled to the processor 1420. Couplings in this embodiment of this application are indirect couplings or communication connections between apparatuses, units, or modules, may be electrical, mechanical, or another form, and are used for information exchange between the apparatuses, the units, and the modules. The processor 1420 may operate with the memory 1430. The processor 1420 may execute the program instruction stored in the memory 1430. At least one of the at least one memory may be included in the processor.

The apparatus 1400 may further include a communications interface 1410 configured to communicate with another device through a transmission medium such that an apparatus in the apparatus 1400 can communicate with the other device. For example, the other device may be a terminal device. The processor 1420 may send and receive data using the communications interface 1410.

A specific connection medium between the communications interface 1410, the processor 1420, and the memory 1430 is not limited in this embodiment of this application. In this embodiment of this application, in FIG. 14, the memory 1430, the processor 1420, and the communications interface 1410 are connected through a bus 1440. The bus is represented by a bold line in FIG. 14. A connection manner between other components is merely an example for description, and is not limited thereto. The bus may be classified into an address bus, a data bus, a control bus, and the like. For ease of representation, only one bold line is used to represent the bus in FIG. 14, but this does not mean that there is only one bus or only one type of bus.

In this embodiment of this application, the processor 1420 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed using a combination of hardware in the processor and a software module.

In this embodiment of this application, the memory 1430 may be a non-volatile memory, such as an HDD or an SSD, or may be a volatile memory, such as a RAM. The memory is any other medium that can be configured to carry or store expected program code that is in a form of an instruction or a data structure and that can be accessed by a computer, but is not limited thereto. The memory in this embodiment of this application may alternatively be a circuit or any other apparatus that can implement a storage function, and is configured to store a program instruction and/or data.

Figure 15:
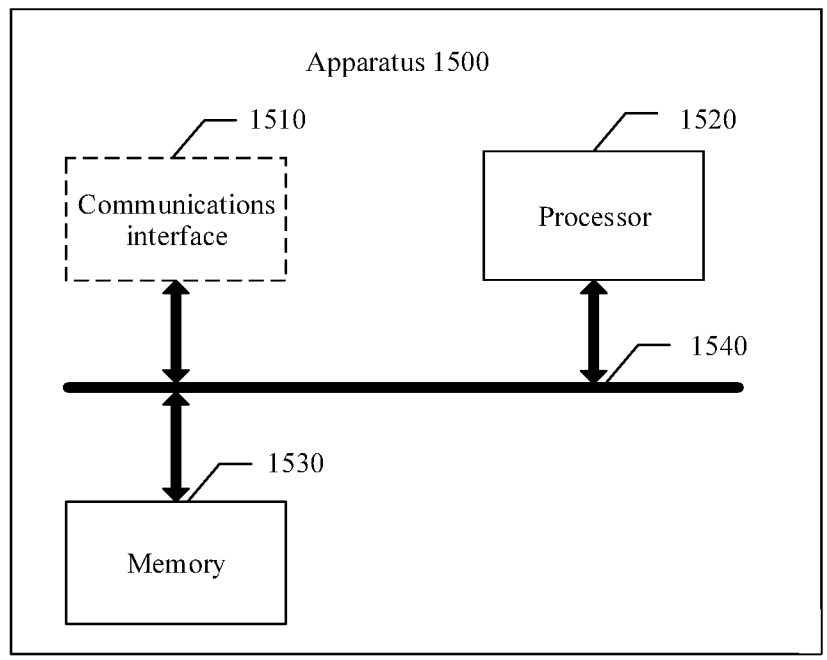
FIG. 15 is a schematic structural diagram of another apparatus according to an embodiment of this application.

FIG. 15 shows an apparatus 1500 according to an embodiment of this application. The apparatus 1500 may be the terminal device in the embodiments shown in FIG. 5 to FIG. 7, and can implement a function of the terminal device in the methods provided in the embodiments of this application. Alternatively, the apparatus 1500 may be an apparatus that can support a terminal device in implementing a function of the terminal device in the methods provided in the embodiments of this application. The apparatus 1500 may be a chip system. In this embodiment of this application, the chip system may include a chip, or may include a chip and another discrete component.

The apparatus 1500 includes at least one processor 1520 configured to implement or support the apparatus 1500 in implementing the function of the access network element in the methods provided in the embodiments of this application. For example, the processor 1520 may verify a signature of a third message using a public key. If the signature is correct, the processor 1520 generates, based on the third message and first input information, a target key used to perform a key activation procedure. For details, refer to the detailed descriptions in the method examples. Details are not described herein again.

The apparatus 1500 may further include at least one memory 1530 configured to store a program instruction and/or data. The memory 1530 is coupled to the processor 1520. Couplings in this embodiment of this application are indirect couplings or communication connections between apparatuses, units, or modules, may be electrical, mechanical, or another form, and are used for information exchange between the apparatuses, the units, and the modules. The processor 1520 may operate with the memory 1530. The processor 1520 may execute the program instruction stored in the memory 1530. At least one of the at least one memory may be included in the processor.

The apparatus 1500 may further include a communications interface 1510 configured to communicate with another device through a transmission medium such that an apparatus in the apparatus 1500 can communicate with the other device. For example, the other device may be a terminal device. The processor 1520 may send and receive data using the communications interface 1510.

A specific connection medium between the communications interface 1510, the processor 1520, and the memory 1530 is not limited in this embodiment of this application. In this embodiment of this application, in FIG. 15, the memory 1530, the processor 1520, and the communications interface 1510 are connected through a bus 1540. The bus is represented by a bold line in FIG. 15. A connection manner between other components is merely an example for description, and is not limited thereto. The bus may be classified into an address bus, a data bus, a control bus, and the like. For ease of representation, only one bold line is used to represent the bus in FIG. 15, but this does not mean that there is only one bus or only one type of bus.

In this embodiment of this application, the processor 1520 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed using a combination of hardware in the processor and a software module.

In this embodiment of this application, the memory 1530 may be a non-volatile memory, such as an HDD or an SSD, or may be a volatile memory, such as a RAM. The memory is any other medium that can be configured to carry or store expected program code that is in a form of an instruction or a data structure and that can be accessed by a computer, but is not limited thereto. The memory in this embodiment of this application may alternatively be a circuit or any other apparatus that can implement a storage function, and is configured to store a program instruction and/or data.

An embodiment of this application further provides a computer-readable storage medium, including an instruction. When the instruction is run on a computer, the computer is enabled to perform the method performed by the access network element in any one of the embodiments in FIG. 3A to FIG. 7.

An embodiment of this application further provides a computer-readable storage medium, including an instruction. When the instruction is run on a computer, the computer is enabled to perform the method performed by the core network element in any one of the embodiments in FIG. 3A to FIG. 4.

An embodiment of this application further provides a computer-readable storage medium, including an instruction. When the instruction is run on a computer, the computer is enabled to perform the method performed by the terminal device in any one of the embodiments in FIG. 3A to FIG. 7.

An embodiment of this application provides a chip system. The chip system includes a processor, may further include a memory, and is configured to implement a function of the access network element in the foregoing methods. The chip system may include a chip, or may include a chip and another discrete component.

An embodiment of this application provides a chip system. The chip system includes a processor, may further include a memory, and is configured to implement a function of the core network element in the foregoing methods. The chip system may include a chip, or may include a chip and another discrete component.

An embodiment of this application provides a chip system. The chip system includes a processor, may further include a memory, and is configured to implement a function of the terminal device in the foregoing methods. The chip system may include a chip, or may include a chip and another discrete component.

An embodiment of this application provides a system. The system includes the foregoing access network element and core network element.

An embodiment of this application provides a system. The system includes the foregoing access network element and terminal device.

All or some of the foregoing methods in the embodiments of this application may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, a network device, a user device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD), a semiconductor medium (for example, an SSD), or the like.

It is clear that, a person skilled in the art can make various modifications and variations to this application without departing from the scope of this application. This application is intended to cover these modifications and variations of this application provided that they fall within the scope defined by the following claims and their equivalent technologies.

What is claimed is:

1. An information sending method comprising:
sending, by an access network element and to an access and management function network element, a request message that comprises an explicit indication indicating whether an access stratum (AS) security mode command (SMC) procedure needs to be triggered;
receiving, by the access and management function network element, the request message;
determining, by the access and management function network element based on the explicit indication carried in the request message and based on a terminal device type of a terminal device, whether the AS SMC procedure is to be performed by:
determining that the AS SMC procedure needs to be performed when the terminal device type is an enhanced mobile broadband (eMBB) type; and
determining that the AS SMC procedure does not need to be performed when the terminal device type is one of a massive machine type of communication (mMTC) type or an ultra-reliable low latency communication (URLLC) type;
sending, by the access and management function network element and when the AS SMC procedure is to be performed, an initial context setup request message to the access network element, wherein the initial context setup request message carries a necessary parameter for performing the AS SMC procedure;

receiving, by the access network element, the necessary parameter from the access and management function network element; and sending, by the access network element based on the necessary parameter from the access and management function network element, an AS SMC message to a terminal.

2. The information sending method of claim 1, wherein the necessary parameter comprises a security context.

3. The information sending method of claim 1, wherein the necessary parameter is a root key (KgNB).

4. The information sending method of claim 1, wherein the necessary parameter triggers the AS SMC procedure.

5. An information sending method implemented by an access and management function network element, wherein the information sending method comprises:

receiving a request message from an access network element, wherein the request message comprises an explicit indication indicating whether an access stratum (AS) security mode command (SMC) procedure needs to be triggered;

determining, based on the explicit indication carried in the request message and based on a terminal device type of a terminal device, whether the AS SMC procedure is to be performed by:

determining that the AS SMC procedure needs to be performed when the terminal device type is an enhanced mobile broadband (eMBB) type; and determining that the AS SMC procedure does not need to be performed when the terminal device type is one of a massive machine type of communication (mMTC) type or an ultra-reliable low latency communication (URLLC) type; and sending, to the access network element and when the AS SMC procedure is to be performed, an initial context setup request message that carries a necessary parameter for performing the AS SMC procedure.

6. The information sending method of claim 5, wherein the necessary parameter comprises a security context.

7. The information sending method of claim 5, wherein the necessary parameter is a root key (KgNB).

8. The information sending method of claim 5, wherein the necessary parameter triggers the AS SMC procedure.

9. An access and management function network element comprising: a communications interface; and a processor coupled to the communications interface and configured to:

receive, using the communications interface, a request message from an access network element, wherein the request message comprises an explicit indication indicating whether an access stratum (AS) security mode command (SMC) procedure needs to be triggered;

determine, based on the explicit indication carried in the request message and based on a terminal device type of a terminal device, whether the AS SMC procedure is to be triggered by:

determining that the AS SMC procedure needs to be performed when the terminal device type is an enhanced mobile broadband (eMBB) type; and determining that the AS SMC procedure does not need to be performed when the terminal device type is one of a massive machine type of communication (mMTC) type or an ultra-reliable low latency communication (URLLC) type; and send, using the communications interface, to the access network element and when the AS SMC procedure is to be performed, an initial context setup request message, wherein the initial context setup request message carries a necessary parameter for performing the AS SMC procedure.

10. The access and management function network element of claim 9, wherein the necessary parameter comprises a security context.

11. The access and management function network element of claim 9, wherein the necessary parameter is a root key (KgNB).

12. A communication system comprising an access network element and an access and management function network element, wherein:

the access network element is configured to:

send, to the access and management function, a request message that comprises an explicit indication indicating whether an access stratum (AS) security mode command (SMC) procedure needs to be triggered;

the access and management function network element is configured to:

receive the request message;

determine, based on the explicit indication carried in the request message and based on a terminal device type of a terminal device, whether the AS SMC procedure is to be performed by:

determining that the AS SMC procedure needs to be performed when the terminal device type is an enhanced mobile broadband (eMBB) type; and determining that the AS SMC procedure does not need to be performed when the terminal device type is one of a massive machine type of communication (mMTC) type or an ultra-reliable low latency communication (URLLC) type;

send, when the AS SMC procedure is to be performed, an initial context setup request message to the access network element, wherein the initial context setup request message carries a necessary parameter for performing the AS SMC procedure;

the access network element is further configured to:

receive the necessary parameter from the access and management function network element; and send, based on the necessary parameter from the access and management function network element, an AS SMC message to a terminal.

13. The communication system of claim 12, wherein the necessary parameter comprises at least one of a security context, a root key (KgNB), or the necessary parameter triggers the AS SMC procedure.

14. The information sending method of claim 1, further comprising obtaining, by the access and management function network element, information related to the terminal device from one of a session management function (SMF) entity or a unified data management (UDM) entity, wherein determining based on the terminal device type of the terminal device, whether the AS SMC procedure needs to be performed, comprises determining, based on the request message and the information related to the terminal device, whether the AS SMC procedure needs to be performed.

15. The information sending method of claim 1, further comprising determining, by the access and management function network element, the type of the terminal device based on at least one of a field in the request message, subscription information of the terminal device in a unified data management (UDM) entity, or location information of the terminal device sent by a policy control function (PCF) entity.

16. The information sending method of claim 1, wherein determining whether the AS SMC procedure is to be performed comprises determining, by the access and management function network element, that bit information of the explicit indication matches a condition for the AS SMC procedure to be performed.

17. The information sending method of claim 1, wherein the explicit indication indicates one of: the AS SMC procedure needs to be triggered, the AS SMC procedure is recommended to be triggered, or the AS SMC procedure does not need to be triggered.

18. The information sending method of claim 5, further comprising obtaining, by the access and management function network element, information related to the terminal device from one of a session management function (SMF) entity or a unified data management (UDM) entity, wherein determining based on the terminal device type of the terminal device, whether the AS SMC procedure needs to be performed, comprises determining, based on the request message and the information related to the terminal device, whether the AS SMC procedure needs to be performed.

19. The information sending method of claim 5, further comprising determining, by the access and management function network element, the type of the terminal device based on at least one of a field in the request message, subscription information of the terminal device in a unified data management (UDM) entity, or location information of the terminal device sent by a policy control function (PCF) entity.

20. The information sending method of claim 5, wherein determining whether the AS SMC procedure is to be performed comprises determining, by the access and management function network element, that bit information of the explicit indication matches a condition for the AS SMC procedure to be performed.

21. The information sending method of claim 5, wherein the explicit indication indicates one of: the AS SMC procedure needs to be triggered, the AS SMC procedure is recommended to be triggered, or the AS SMC procedure does not need to be triggered.

* * * * *